US012703786B2

(12) United States Patent
Nelson

(10) Patent No.: US 12,703,786 B2
(45) Date of Patent: Aug. 11, 2026

(54) NANOCELLULOSE-DISPERSION CONCENTRATES AND MASTERBATCHES, METHODS OF MAKING AND USING THE SAME, AND NANOCELLULOSE-CONTAINING COMPOSITES

(71) Applicant: GranBio Intellectual Property Holdings, LLC, Minnetrista, MN (US)

(72) Inventor: Kimberly Nelson, Atlanta, GA (US)

(73) Assignee: GranBio Intellectual Property Holdings, LLC, Atlanta, GA (US)

( * ) Notice: Subject to any disclaimer, the term of this patent is extended or adjusted under 35 U.S.C. 154(b) by 113 days.

(21) Appl. No.: 18/089,679

(22) Filed: Dec. 28, 2022

(65) Prior Publication Data

US 2023/0203280 A1 Jun. 29, 2023

Related U.S. Application Data

(63) Continuation of application No. 17/418,800, filed as application No. PCT/US2020/020270 on Feb. 28, 2020.

(Continued)

(51) Int. Cl.
*C08L 1/02* (2006.01)
*C08L 23/12* (2006.01)

(52) U.S. Cl.
CPC ................ *C08L 1/02* (2013.01); *C08L 23/12* (2013.01); *C08L 2201/56* (2013.01); *C08L 2205/03* (2013.01)

(58) Field of Classification Search
CPC ........ C08L 1/02; C08L 23/12; C08L 2201/56; C08L 2205/03; C08L 1/04
See application file for complete search history.

(56) References Cited

U.S. PATENT DOCUMENTS

2008/0033093 A1* 2/2008 Menceloglu ........... C08K 3/346 524/445
2013/0331518 A1* 12/2013 Immonen ............... C08L 97/02 264/211
2016/0168363 A1* 6/2016 Nelson .................... C08J 3/005 106/18.11

FOREIGN PATENT DOCUMENTS

JP 2010106251 A * 5/2010 ............. C08B 11/14

OTHER PUBLICATIONS

English Machine Translation of JP2010106251 (A) obtained on Sep. 11, 2024 from https://worldwide.espacenet.com/publicationDetails/biblio?CC=JP&NR=2010106251A&KC=A&FT=D&ND=3&date=20100513&DB=&locale=en_EP (Year: 2010).*

(Continued)

*Primary Examiner* — Catherine S Branch
*Assistant Examiner* — Olga Lucia Donahue
(74) *Attorney, Agent, or Firm* — O'Connor & Company; Ryan P. O'Connor

(57) ABSTRACT

The disclosed technology provides improved compositions and methods for dispersion and drying of nanocellulose, for polymer composites and other systems. Some variations provide a nanocellulose-dispersion concentrate comprising nanocellulose and a dispersion/drying agent selected for compatibility with the nanocellulose and with the nanocellulose-containing composite product, wherein the dispersion/drying agent is selected from the group consisting of waxes, polyolefins, olefin-maleic anhydride copolymers, olefin-acrylic acid copolymers, polyols, fatty acids, fatty alcohols, polyol-glyceride esters, polydimethylsiloxanes, polydimethylsiloxane-alkyl esters, polyacrylamides, starches, cellulose derivatives, particulates, and combinations or reaction products thereof, and wherein the nanocellulose-dispersion concentrate is in solid form (e.g., a powder) or liquid form. Other variations provide a (Continued)

nanocellulose-dispersion masterbatch (e.g., pellets) comprising the nanocellulose-dispersion concentrate and a carrier material. Other variations provide a nanocellulose-containing composite including the nanocellulose-dispersion masterbatch or concentrate and a matrix material. Processes of making and using the disclosed compositions are described.

11 Claims, 12 Drawing Sheets

Related U.S. Application Data

(60) Provisional application No. 62/787,462, filed on Jan. 2, 2019.

(56) References Cited

OTHER PUBLICATIONS

Rui et al. (Advanced Materials Research, 2013, ISSN 1662-8985, vols. 652-654, pp. 418-422). (Year: 2013).*
Miao et al. (Polymer 101 (2016) 338-346) (Year: 2016).*
Miwa et al. (Macromolecules, vol. 34, No. 7, 2001). (Year: 2001).*

* cited by examiner

A matrix material is selected based on engineering and product needs

A nanocellulose material is selected such that the nanocellulose improves some property of the matrix material

A dispersion/drying agent is selected, wherein the dispersion/drying agent is compatible with the nanocellulose and the final composite product

A nanocellulose-dispersion concentrate is made by combining the dispersion/drying agent and the nanocellulose

A nanocellulose-dispersion masterbatch is optionally made by combining the nanocellulose-dispersion concentrate with a carrier material

The nanocellulose-dispersion masterbatch, or the concentrate itself, is combined with the matrix material to fabricate a composite product

FIG. 12

NANOCELLULOSE-DISPERSION CONCENTRATES AND MASTERBATCHES, METHODS OF MAKING AND USING THE SAME, AND NANOCELLULOSE-CONTAINING COMPOSITES

PRIORITY DATA

This patent application is a continuation-in-part application of U.S. patent application Ser. No. 17/418,800, filed on Jun. 26, 2021, which is a U.S. national-stage application under 35 U.S.C. § 371 of PCT/US2020/020270, filed on Feb. 28, 2020, which claims priority to U.S. Provisional Patent Application No. 62/787,462, filed on Jan. 2, 2019, each of which is hereby incorporated by reference herein.

FIELD

The present invention generally relates to compositions and methods for dispersing nanocellulose in polymers and other systems.

BACKGROUND

Nanocellulose has gained prominence as a nanostructured material. Nanocellulose features biodegradability and environmental sustainability since it is derived from a naturally occurring resource, cellulose—which is the most abundant polymer on earth. In addition, nanocellulose offers tremendous technical potential to improve the mechanical strength and other properties of composites, regardless of the social and environmental sustainability of nanocellulose. Nanocellulose is composed of parallel linear polysaccharide molecules. Nanocellulose has attractive physicochemical properties, such as extraordinarily high stiffness and strength, alongside its abundance and sustainability.

Nanocellulose is being developed for use in a wide variety of applications such as polymer reinforcement, anti-microbial films, biodegradable food packaging, printing papers, pigments and inks, paper and board packaging, barrier films, adhesives, biocomposites, wound healing, pharmaceuticals and drug delivery, textiles, water-soluble polymers, construction materials, recyclable interior and structural components for the transportation industry, rheology modifiers, low-calorie food additives, cosmetics thickeners, pharmaceutical tablet binders, bioactive paper, pickering stabilizers for emulsion and particle stabilized foams, paint formulations, films for optical switching, and detergents.

However, there remains a serious technical challenge associated with widespread use of nanocellulose. In particular, removing water from nanocellulose suspensions to maintain nanoscale dimensions is very difficult. In most cases, nanocellulose particles processed as aqueous suspensions because of their hydrophilic nature and propensity to agglomerate during drying. There is an industrial need to develop robust dispersion and drying processes which will maintain nanoscale dimensions for materials applications where a dry form is necessary. Drier forms of nanocellulose also mitigate high transportation costs of dilute aqueous suspensions and expand the number of end-use applications that have limitations on the amount of water that can be added to the product.

In the case of both cellulose nanocrystals as well as cellulose nanofibrils (or microfibrils), the dispersibility of nanocellulose in non-aqueous-based polymers and other systems has remained problematic, as they typically require dried forms of nanocellulose for incorporation. Nanocellulose tends to irreversibly bond to itself during drying, resulting in large agglomerates of nanocellulose. The large agglomerates often impede or even destroy the intended property benefit for the polymer composite or other system into which the nanocellulose particles are being introduced. For example, well-dispersed nanocellulose particles in polymers can result in significant mechanical strength enhancement. When the nanocellulose becomes agglomerated, however, there may be no mechanical strength enhancement at all—or even worse, large agglomerates can result in stress concentrators that can cause premature failure of a polymer part.

In terms of improving nanocellulose dispersion in non-aqueous-based products, various drying approaches have been tried. These approaches usually require extreme measures that would prove difficult to scale-up to commercial quantities, and are therefore uneconomical. Generally, these methods are based on lyophilization (freeze drying) of nanocellulose, which is the established, laboratory method for preventing irreversible inter-particle bonding of nanocellulose. Freeze-drying is not economical nor scalable for commercial production of nanocellulose.

For practically all non-aqueous applications in which nanocellulose is used, improving its dispersion and thus the utility and benefit to these applications has been a major hurdle for implementation of nanocellulose. Thus, it has become important to improve nanocellulose dispersion using economical methods that make the nanocellulose highly dispersible in polymers and other systems. Economical methods usually entail a dried composition containing nanocellulose. A dried form of nanocellulose is especially important in the field of thermoplastic processing such as extrusion and injection molding, in which thermal melting processes are encountered. During thermal melting processes with non-polar thermoplastics, water is a detriment to satisfactory processing.

In view of the aforementioned needs in the art, improved compositions and methods for dispersion and drying of nanocellulose are acutely needed, for polymer composites and other systems beyond polymers.

SUMMARY

Some variations of the invention provide a nanocellulose-dispersion concentrate comprising:

(a) from about 5 wt % to about 90 wt % nanocellulose; and (b) from about 5 wt % to about 95 wt % dispersion/drying agent selected for compatibility with the nanocellulose, wherein the dispersion/drying agent is selected from the group consisting of waxes, polyolefins, olefin-maleic anhydride copolymers, olefin-acrylic acid copolymers, polyols, fatty acids, fatty alcohols, polyol-glyceride esters, polydimethylsiloxanes, polydimethylsiloxane-alkyl esters, polyacrylamides, starches, cellulose derivatives, particulates, and combinations or reaction products thereof, and wherein the nanocellulose-dispersion concentrate is in solid form or liquid form.

In some embodiments, the nanocellulose is present at a concentration of about 10 wt % to about 70 wt %, and the dispersion/drying agent is present at a concentration of about 5 wt % to about 50 wt %. In some embodiments, the weight ratio of nanocellulose to dispersion/drying agent is selected from about 0.5 to about 2. The nanocellulose-dispersion concentrate may consist essentially of the nanocellulose and the dispersion/drying agent, i.e. without any other functional components present.

The nanocellulose may include cellulose nanocrystals, cellulose nanofibrils, microfibrillated cellulose, or a combination thereof. In some embodiments, the nanocellulose includes lignin-containing nanocellulose, such as lignin-coated nanocellulose.

In some embodiments, the dispersion/drying agent is a functionalized polyalkylene wax that is functionalized for compatibility with the nanocellulose. For example, the functionalized polyalkylene wax may be a functionalized polyethylene wax, a functionalized polypropylene wax, a functionalized polybutylene wax, or a combination thereof. In certain embodiments, the dispersion/drying agent is a low-molecular weight oligomer or polymer of ethylene or functionalized ethylene, with number-average degree of polymerization from 2 to 1000, such as from 5 to 500.

In some embodiments, the dispersion/drying agent is a copolymer of (a) one or more $C_2$-$C_4$ olefins and (b) maleic anhydride.

In some embodiments, the dispersion/drying agent is a copolymer of (a) one or more $C_2$-$C_4$ olefins and (b) acrylic acid.

In some embodiments, the dispersion/drying agent includes a polyol selected from ethylene glycol, polyethylene glycol, propylene glycol, polypropylene glycol, glycerol, butylene glycol, polybutylene glycol, or a combination thereof, wherein the polyol is optionally esterified with a fatty acid.

In some embodiments, the dispersion/drying agent includes an alkyl ester polydimethylsiloxane emulsion.

In some embodiments, the dispersion/drying agent includes cationic starch, amphoteric starch, thermoplastic starch, or a combination thereof.

In some embodiments, the dispersion/drying agent includes a particulate, optionally having a surface treatment to provide a surface charge and/or improve interfacial adhesion, such as silylation of glass fibers. The particulate may be selected from the group consisting of clay, nano-clay, talc, wollastonite, calcium carbonate (e.g., precipitated calcium carbonate), silica, mica, kaolin, nickel, glass fibers, bentonite, biotite, illite, kaolin, vermiculite, zeolite, carbon fibers, carbon nanotubes, graphene, or a combination thereof. In certain embodiments, the dispersion/drying agent includes at least one fatty acid and at least one particulate.

The nanocellulose-dispersion concentrate may further comprise a liquid solvent, such as a solvent selected from the group consisting of water, $C_1$-$C_8$ alcohols, $C_2$-$C_8$ polyols, and combinations thereof.

The nanocellulose-dispersion concentrate may further comprise one or more elastomers (e.g., natural rubber or synthetic rubber), such as at a concentration from about 0.1 wt % to about 50 wt %.

Other variations of the invention provide a nanocellulose-dispersion masterbatch comprising:

(a) from about 1 wt % to about 75 wt % nanocellulose;

(b) from about 1 wt % to about 89 wt % dispersion/drying agent selected for compatibility with the nanocellulose; and (c) from about 10 wt % to about 98 wt % carrier material (e.g., a carrier polymer) that is different than the nanocellulose and the dispersion/drying agent, wherein the dispersion/drying agent is selected from the group consisting of waxes, polyolefins, olefin-maleic anhydride copolymers, olefin-acrylic acid copolymers, polyols, fatty acids, fatty alcohols, polyol-glyceride esters, polydimethylsiloxanes, polydimethylsiloxane-alkyl esters, polyacrylamides, starches, cellulose derivatives, particulates, and combinations or reaction products thereof, and wherein the nanocellulose-dispersion masterbatch is in solid form or liquid form.

In some masterbatch embodiments, the nanocellulose is present at a concentration of about 10 wt % to about 50 wt %, and wherein the dispersion/drying agent is present at a concentration of about 5 wt % to about 75 wt %. In some masterbatch embodiments, the weight ratio of the nanocellulose to the dispersion/drying agent is selected from about 0.5 to about 2. The nanocellulose-dispersion masterbatch may consist essentially of the nanocellulose, the dispersion/drying agent, and the carrier material.

In some masterbatch embodiments, the nanocellulose includes cellulose nanocrystals, cellulose nanofibrils, microfibrillated cellulose, or a combination thereof.

In some masterbatch embodiments, the nanocellulose includes lignin-containing nanocellulose, such as lignin-coated nanocellulose.

In some masterbatch embodiments, the dispersion/drying agent is a functionalized polyalkylene wax that is functionalized for compatibility with the nanocellulose. For example, the functionalized polyalkylene wax may be a functionalized polyethylene wax, a functionalized polypropylene wax, a functionalized polybutylene wax, or a combination thereof. In certain masterbatch embodiments, the dispersion/drying agent is a low-molecular weight oligomer or polymer of ethylene or functionalized ethylene, with number-average degree of polymerization from 2 to 1000.

In some masterbatch embodiments, the dispersion/drying agent is a copolymer of (a) one or more $C_2$-$C_4$ olefins and (b) maleic anhydride.

In some masterbatch embodiments, the dispersion/drying agent is a copolymer of (a) one or more $C_2$-$C_4$ olefins and (b) acrylic acid.

In some masterbatch embodiments, the dispersion/drying agent includes a polyol selected from ethylene glycol, polyethylene glycol, propylene glycol, polypropylene glycol, glycerol, butylene glycol, polybutylene glycol, or a combination thereof, wherein the polyol is optionally esterified with a fatty acid.

In some masterbatch embodiments, the dispersion/drying agent includes an alkyl ester polydimethylsiloxane emulsion.

In some masterbatch embodiments, the dispersion/drying agent includes cationic starch, amphoteric starch, thermoplastic starch, or a combination thereof.

In some masterbatch embodiments, the dispersion/drying agent includes a particulate that optionally has a surface treatment to provide a surface charge and/or improve interfacial adhesion, such as silylation of glass fibers. The particulate may be selected from the group consisting of clay, nano-clay, talc, wollastonite, calcium carbonate (e.g., precipitated calcium carbonate), silica, mica, kaolin, nickel, glass fibers, bentonite, biotite, illite, kaolin, vermiculite, zeolite, carbon fibers, carbon nanotubes, graphene, or a combination thereof. In certain masterbatch embodiments, the dispersion/drying agent includes at least one fatty acid and at least one particulate.

The dispersion/drying agent may also be selected for compatibility with the carrier material of the masterbatch.

The carrier material may be a carrier polymer or another type of material. When the carrier material is or includes a polymer, the polymer may be selected from the group consisting of polyolefins, polyols, polyamides, polylactide, polystyrene, polycarbonate, polyethylene terephthalate, and combinations thereof.

In preferred embodiments of the nanocellulose-dispersion masterbatch, the masterbatch is in solid, powder form.

Other variations of the invention provide a nanocellulose-polymer composite product comprising:

(a) from about 0.05 wt % to about 10 wt % nanocellulose;

(b) from about 0.05 wt % to about 10 wt % dispersion/drying agent selected for compatibility with the nanocellulose and with the nanocellulose-polymer composite product, wherein the dispersion/drying agent is selected from the group consisting of waxes, polyolefins, olefin-maleic anhydride copolymers, olefin-acrylic acid copolymers, polyols, fatty acids, fatty alcohols, polyol-glyceride esters, polydimethylsiloxanes, polydimethylsiloxane-alkyl esters, polyacrylamides, starches, cellulose derivatives, particulates, and combinations or reaction products thereof;

(c) from about 0.1 wt % to about 10 wt % carrier polymer selected for compatibility with the nanocellulose and the dispersion/drying agent; and (d) from about 50 wt % to about 99.8 wt % matrix polymer.

In some embodiments of the composite product, the nanocellulose is present at a concentration of about 0.1 wt % to about 5 wt % in the nanocellulose-polymer composite product. In some embodiments of the composite product, the weight ratio of the nanocellulose to the dispersion/drying agent is selected from about 0.5 to about 2. The nanocellulose-polymer composite product may consist essentially of the nanocellulose, the dispersion/drying agent, the carrier polymer, and the matrix polymer.

In some embodiments of the composite product, the nanocellulose includes cellulose nanocrystals, cellulose nanofibrils, microfibrillated cellulose, or a combination thereof.

In some embodiments of the composite product, the nanocellulose includes lignin-containing nanocellulose, such as lignin-coated nanocellulose.

In some embodiments of the composite product, the dispersion/drying agent is a functionalized polyalkylene wax that is functionalized for compatibility with the nanocellulose and optionally with the nanocellulose-polymer composite product. For example, the functionalized polyalkylene wax may be a functionalized polyethylene wax, a functionalized polypropylene wax, a functionalized polybutylene wax, or a combination thereof. In certain embodiments of the composite product, the dispersion/drying agent is a low-molecular weight oligomer or polymer of ethylene or functionalized ethylene, with number-average degree of polymerization from 2 to 1000.

In some embodiments of the composite product, the dispersion/drying agent is a copolymer of (a) one or more $C_2$-$C_4$ olefins and (b) maleic anhydride.

In some embodiments of the composite product, the dispersion/drying agent is a copolymer of (a) one or more $C_2$-$C_4$ olefins and (b) acrylic acid.

In some embodiments of the composite product, the dispersion/drying agent includes a polyol selected from ethylene glycol, polyethylene glycol, propylene glycol, polypropylene glycol, glycerol, butylene glycol, polybutylene glycol, or a combination thereof, wherein the polyol is optionally esterified with a fatty acid.

In some embodiments of the composite product, the dispersion/drying agent includes an alkyl ester polydimethylsiloxane emulsion.

In some embodiments of the composite product, the dispersion/drying agent includes cationic starch, amphoteric starch, thermoplastic starch, or a combination thereof.

In some embodiments of the composite product, the dispersion/drying agent includes a particulate having a surface treatment to provide a surface charge and/or improve interfacial adhesion, such as silylation of glass fibers. The particulate may be selected from the group consisting of clay, nano-clay, talc, wollastonite, calcium carbonate (e.g., precipitated calcium carbonate), silica, mica, kaolin, nickel, glass fibers, bentonite, biotite, illite, kaolin, vermiculite, zeolite, carbon fibers, carbon nanotubes, graphene, or a combination thereof. In certain embodiments, the dispersion/drying agent includes at least one fatty acid and at least one particulate.

In some embodiments of the composite product, the dispersion/drying agent is also selected for compatibility with the carrier polymer, the matrix polymer, or both of these.

The carrier polymer may be selected from the group consisting of polyolefins, polyols, polyamides, polylactide, polystyrene, polycarbonate, polyethylene terephthalate, and combinations thereof. The carrier polymer may be the same polymer as the matrix polymer. Alternatively, the carrier polymer may be a different polymer compared to the matrix polymer.

In various nanocellulose-polymer composite products, the matrix polymer is selected from the group consisting of polyolefins, polyols, polyesters, polyamides, polylactide, polystyrene, polycarbonates, polyacrylates, polystyrenes, styrenic rubbers, polyurethanes, polyureas, poly(amide-enamine)s, polyanhydrides, polyhydroxyalkanoates, poly(alkene dicarboxylate)s, silicones, carbonaceous polymers, and combinations or co-polymers thereof.

Still other variations of the invention provide a nanocellulose-polymer composite product comprising:

(a) from about 0.05 wt % to about 15 wt % nanocellulose;

(b) from about 0.05 wt % to about 15 wt % dispersion/drying agent selected for compatibility with the nanocellulose and with the nanocellulose-polymer composite product, wherein the dispersion/drying agent is selected from the group consisting of waxes, polyolefins, olefin-maleic anhydride copolymers, olefin-acrylic acid copolymers, polyols, fatty acids, fatty alcohols, polyol-glyceride esters, polydimethylsiloxanes, polydimethylsiloxane-alkyl esters, polyacrylamides, starches, cellulose derivatives, particulates, and combinations or reaction products thereof; and (c) from about 50 wt % to about 99.9 wt % matrix polymer.

In some embodiments, there is no carrier polymer, such as when the above-described nanocellulose-dispersion concentrate is incorporated directly into a matrix polymer, without proceeding through a masterbatch.

In some embodiments of the composite product not containing a carrier polymer, the nanocellulose is present at a concentration of about 0.1 wt % to about 5 wt %, such as from about 0.5 wt % to about 2 wt %, in the nanocellulose-polymer composite product. The nanocellulose-polymer composite product may consist essentially of the nanocellulose, the dispersion/drying agent, and the matrix polymer. The options for nanocellulose, dispersion/drying agent, and matrix polymer are the same as the options summarized above for those components in nanocellulose-polymer composite products that contain a carrier polymer.

Other variations of the invention provide a nanocellulose-containing composite product comprising:

(a) from about 0.05 wt % to about 10 wt % nanocellulose;

(b) from about 0.05 wt % to about 10 wt % dispersion/drying agent selected for compatibility with the nanocellulose and with the nanocellulose-containing composite product, wherein the dispersion/drying agent is selected from the group consisting of waxes, polyolefins, olefin-maleic anhydride copolymers, olefin-acrylic acid copolymers, polyols, fatty acids, fatty alcohols, polyol-glyceride esters, polydimethylsiloxanes, polydimethylsiloxane-alkyl esters, polyacrylamides, starches, cellulose derivatives, particulates, and combinations or reaction products thereof;

(c) from about 0.1 wt % to about 10 wt % carrier material selected for compatibility with the nanocellulose and the dispersion/drying agent; and (d) from about 50 wt % to about 99.8 wt % matrix material.

Still other variations of the invention provide a nanocellulose-containing composite product comprising:

(a) from about 0.05 wt % to about 15 wt % nanocellulose;

(b) from about 0.05 wt % to about 15 wt % dispersion/drying agent selected for compatibility with the nanocellulose and with the nanocellulose-containing composite product, wherein the dispersion/drying agent is selected from the group consisting of waxes, polyolefins, olefin-maleic anhydride copolymers, olefin-acrylic acid copolymers, polyols, fatty acids, fatty alcohols, polyol-glyceride esters, polydimethylsiloxanes, polydimethylsiloxane-alkyl esters, polyacrylamides, starches, cellulose derivatives, particulates, and combinations or reaction products thereof; and (c) from about 50 wt % to about 99.9 wt % matrix material.

Some variations provide a process to produce a nanocellulose-dispersion concentrate (such as a concentrate disclosed above), the process comprising:

providing a nanocellulose gel comprising nanocellulose and water;

selecting a dispersion/drying agent for compatibility with the nanocellulose, wherein the dispersion/drying agent is selected from the group consisting of waxes, polyolefins, olefin-maleic anhydride copolymers, olefin-acrylic acid copolymers, polyols, fatty acids, fatty alcohols, polyol-glyceride esters, polydimethylsiloxanes, polydimethylsiloxane-alkyl esters, polyacrylamides, starches, cellulose derivatives, particulates, and combinations or reaction products thereof;

mixing the nanocellulose gel and the dispersion/drying agent;

removing at least a portion of the water, during the mixing step or after the mixing step, to generate a nanocellulose-dispersion concentrate;

optionally milling the nanocellulose-dispersion concentrate to generate a powder; and recovering the nanocellulose-dispersion concentrate in solid form or liquid form.

In some embodiments, the step of removing at least a portion of the water comprises high-shear mixing with heating to a temperature of at least 50° C.

In some embodiments, the process further comprises combining the nanocellulose-dispersion concentrate with a carrier material, to form a nanocellulose-dispersion masterbatch. The carrier material may be a carrier polymer, for example.

In some embodiments, the process further comprises combining the nanocellulose-dispersion masterbatch with a matrix material, to form a nanocellulose-containing composite product.

The matrix material may be a matrix polymer. For example, the matrix polymer may be selected from the group consisting of polyolefins, polyols, polyesters, polyamides, polylactide, polystyrene, polycarbonates, polyacrylates, polystyrenes, natural rubbers, synthetic rubbers, styrenic rubbers, polyurethanes, polyureas, poly(amide-enamine)s, polyanhydrides, polyhydroxyalkanoates, poly(alkene dicarboxylate)s, silicones, carbonaceous polymers, and combinations or co-polymers thereof.

Alternatively, or additionally, the matrix material may be a material other than a polymer, such as a material selected from the group consisting of paper, paperboard, fiber and wood composites (e.g., particleboard and molded pulp products), emulsions, hydrogels, carbon, organic solids, inorganic solids, oils, organic liquids, inorganic liquids, cementitious materials, particulates, ceramics, metals, metal alloys, glass, and combinations thereof.

The drying step (removing at least a portion of the water) to form a concentrate may be carried out at the same location as, or a different location than, the optional the step of making a masterbatch. The drying step may also be carried out at the same location as, or a different location than, the step of combining the nanocellulose-dispersion masterbatch or concentrate with a matrix material.

In some embodiments, the process further comprises combining the nanocellulose-dispersion concentrate directly (not via a masterbatch) with a matrix material, to form a nanocellulose-containing composite product.

When a nanocellulose-dispersion concentrate is directly added to a matrix material, the matrix material may be a matrix polymer, such as a polymer selected from the group consisting of polyolefins, polyols, polyesters, polyamides, polylactide, polystyrene, polycarbonates, polyacrylates, polystyrenes, styrenic rubbers, natural rubbers, synthetic rubbers, polyurethanes, polyureas, poly(amide-enamine)s, polyanhydrides, polyhydroxyalkanoates, poly(alkene dicarboxylate)s, silicones, carbonaceous polymers, and combinations or co-polymers thereof.

Alternatively, or additionally, the matrix material may be selected from the group consisting of paper, paperboard, fiber and wood composites, emulsions, hydrogels, carbon, organic solids, inorganic solids, oils, organic liquids, inorganic liquids, cementitious materials, particulates, ceramics, metals, metal alloys, glass, and combinations thereof.

Some variations provide a process to produce a nanocellulose-dispersion masterbatch (such as a masterbatch disclosed above), the process comprising:

providing a nanocellulose gel comprising nanocellulose and water;

selecting a dispersion/drying agent for compatibility with the nanocellulose, wherein the dispersion/drying agent is selected from the group consisting of waxes, polyolefins, olefin-maleic anhydride copolymers, olefin-acrylic acid copolymers, polyols, fatty acids, fatty alcohols, polyol-glyceride esters, polydimethylsiloxanes, polydimethylsiloxane-alkyl esters, polyacrylamides, starches, cellulose derivatives, particulates, and combinations or reaction products thereof;

mixing the nanocellulose gel and the dispersion/drying agent;

removing at least a portion of the water, during the mixing step or after the mixing step, to generate a nanocellulose-dispersion concentrate;

optionally milling the nanocellulose-dispersion concentrate to generate a concentrate powder;

introducing a carrier polymer (or other carrier material) to the nanocellulose-dispersion concentrate to generate a nanocellulose-dispersion masterbatch, during mixing the nanocellulose gel and the dispersion/drying agent, and/or during removing at least a portion of the water, and/or after removing at least a portion of the water, thereby generating a nanocellulose-dispersion masterbatch, and/or while milling (if performed) the nanocellulose-dispersion concentrate to generate a concentrate powder, and/or after milling (if performed) the nanocellulose-dispersion concentrate to generate a concentrate powder;

optionally milling the nanocellulose-dispersion masterbatch to generate a masterbatch powder; and recovering the nanocellulose-dispersion masterbatch, preferably in solid form.

Some variations provide a process to produce a nanocellulose-polymer composite product (such as a composite product disclosed above), the process comprising:

providing a nanocellulose gel comprising nanocellulose and water;

selecting a dispersion/drying agent for compatibility with the nanocellulose and with the nanocellulose-polymer composite product, wherein the dispersion/drying agent is selected from the group consisting of waxes, polyolefins, olefin-maleic anhydride copolymers, olefin-acrylic acid copolymers, polyols, fatty acids, fatty alcohols, polyol-glyceride esters, polydimethylsiloxanes, polydimethylsiloxane-alkyl esters, polyacrylamides, starches, cellulose derivatives, particulates, and combinations or reaction products thereof;

mixing the nanocellulose gel and the dispersion/drying agent;

removing at least a portion of the water, during the mixing step or after the mixing step, to generate a nanocellulose-dispersion concentrate;

optionally milling the nanocellulose-dispersion concentrate to generate a concentrate powder;

introducing a carrier polymer to the nanocellulose-dispersion concentrate to generate a nanocellulose-dispersion masterbatch, during mixing the nanocellulose gel and the dispersion/drying agent, and/or during removing at least a portion of the water, and/or after removing at least a portion of the water, thereby generating a nanocellulose-dispersion masterbatch, and/or while milling (if performed) the nanocellulose-dispersion concentrate to generate a concentrate powder, and/or after milling (if performed) the nanocellulose-dispersion concentrate to generate a concentrate powder;

optionally milling the nanocellulose-dispersion masterbatch to generate a masterbatch powder;

mixing the nanocellulose-dispersion masterbatch with a matrix polymer, and mechanically and/or thermally processing the combined material, to generate a nanocellulose-polymer composite product; and recovering the nanocellulose-polymer composite product.

Certain variations provide a process to produce a nanocellulose-polymer composite product without a carrier polymer, the process comprising:

providing a nanocellulose gel comprising nanocellulose and water;

selecting a dispersion/drying agent for compatibility with the nanocellulose and with the nanocellulose-polymer composite product, wherein the dispersion/drying agent is selected from the group consisting of waxes, polyolefins, olefin-maleic anhydride copolymers, olefin-acrylic acid copolymers, polyols, fatty acids, fatty alcohols, polyol-glyceride esters, polydimethylsiloxanes, polydimethylsiloxane-alkyl esters, polyacrylamides, starches, cellulose derivatives, particulates, and combinations or reaction products thereof;

mixing the nanocellulose gel and the dispersion/drying agent;

removing at least a portion of the water, during the mixing step or after the mixing step, to generate a nanocellulose-dispersion concentrate;

optionally milling the nanocellulose-dispersion concentrate to generate a concentrate powder;

mixing the nanocellulose-dispersion concentrate with a matrix polymer, and mechanically and/or thermally processing the combined material, to generate a nanocellulose-polymer composite product; and recovering the nanocellulose-polymer composite product.

Some variations of the invention provide a nanocellulose-containing composite product comprising:

(a) from about 0.05 wt % to about 50 wt % nanocellulose;

(b) from about 0.05 wt % to about 10 wt % compatibilizer, wherein the compatibilizer is selected from the group consisting of succinic anhydride, alkenylsuccinic anhydrides, alkyl ketene dimers, olefin-styrene copolymers, olefin-glycidyl copolymers, olefin-methacrylate copolymers, olefin-styrene-glycidyl copolymers, olefin-glycidyl-methacrylate copolymers, olefin-styrene-glycidyl-methacrylate copolymers, and combinations or reaction products thereof;

(c) from about 50 wt % to about 99.9 wt % matrix material.

In some embodiments, the nanocellulose is present at a concentration of about 0.1 wt % to about 5 wt % in the nanocellulose-containing composite product.

In some embodiments, the weight ratio of the nanocellulose to the compatibilizer is selected from about 0.1 to about 10.

In some embodiments, the nanocellulose-polymer composite product consists essentially of the nanocellulose, the compatibilizer, and the matrix material.

The nanocellulose may include cellulose nanocrystals, cellulose nanofibrils, microfibrillated cellulose, or a combination thereof. The nanocellulose may include or consist essentially of lignin-containing nanocellulose. The nanocellulose may include or consist essentially of lignin-coated nanocellulose.

In some embodiments, the compatibilizer is selected from alkenylsuccinic anhydrides, such as those having the formula:

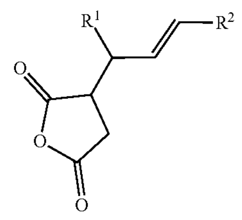

wherein $R^1$ is selected from H, $C_1$-$C_{24}$ linear or branched alkanes, $C_2$-$C_{24}$ linear or branched alkenes, $C_6$-$C_{24}$ linear or branched aromatics, or a combination thereof; and wherein $R^2$ is selected from H, $C_1$-$C_{24}$ linear or branched alkanes, $C_2$-$C_{24}$ linear or branched alkenes, $C_6$-$C_{24}$ linear or branched aromatics, or a combination thereof.

In some embodiments using alkenylsuccinic anhydrides, $R^1$ is selected from $C_2$-$C_{24}$ linear or branched alkanes, $C_4$-$C_{24}$ linear or branched alkenes, $C_8$-$C_{24}$ linear or branched aromatics, or a combination thereof; and $R^2$ is selected from $C_2$-$C_{24}$ linear or branched alkanes, $C_4$-$C_{24}$ linear or branched alkenes, $C_8$-$C_{24}$ linear or branched aromatics, or a combination thereof. In certain embodiments, $R^1$ is selected from $C_5$-$C_{15}$ linear or branched alkanes; and $R^2$ is selected from $C_5$-$C_{15}$ linear or branched alkanes.

In some embodiments, the compatibilizer is selected from alkyl ketene dimers, such as those having the formula:

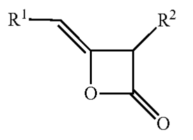

wherein $R^1$ is selected from $C_4$-$C_{24}$ linear or branched alkanes, $C_4$-$C_{24}$ linear or branched alkenes, $C_6$-$C_{24}$ linear or branched aromatics, or a combination thereof; and wherein $R^2$ is selected from $C_4$-$C_{24}$ linear or branched alkanes, $C_4$-$C_{24}$ linear or branched alkenes, $C_6$-$C_{24}$ linear or branched aromatics, or a combination thereof.

In some embodiments using alkyl ketene dimers, $R^1$ is selected from $C_8$-$C_{24}$ linear or branched alkanes, $C_8$-$C_{24}$ linear or branched alkenes, $C_8$-$C_{24}$ linear or branched aromatics, or a combination thereof; and $R^2$ is selected from $C_8$-$C_{24}$ linear or branched alkanes, $C_8$-$C_{24}$ linear or branched alkenes, $C_8$-$C_{24}$ linear or branched aromatics, or a combination thereof. In certain embodiments, $R^1$ is selected from $C_{10}$-$C_{15}$ linear or branched alkanes; and $R^2$ is selected from $C_{10}$-$C_{15}$ linear or branched alkanes.

In some embodiments, the compatibilizer is selected from olefin-styrene-glycidyl-methacrylate copolymers. An exemplary olefin-styrene-glycidyl-methacrylate copolymer is polypropylene homopolymer grafted with poly(styrene-co-methyl methacrylate-co-glycidyl methacrylate).

In the nanocellulose-containing composite product, the matrix material may be selected from the group consisting of polymers, paper, paperboard, fiber and wood composites, emulsions, hydrogels, carbon, organic solids, inorganic solids, oils, organic liquids, inorganic liquids, cementitious materials, minerals, ceramics, metals, metal alloys, glass, and combinations thereof. Polymers may be selected from the group consisting of polyolefins, polyols, polyesters, polyamides, polylactide, polystyrene, polycarbonates, polyacrylates, polystyrenes, polybutadiene, styrene-butadiene rubbers, natural rubbers, polyurethanes, polyureas, poly(amide-enamine)s, polyanhydrides, polyhydroxyalkanoates, poly(alkene dicarboxylate)s, silicones, carbonaceous polymers, and combinations or co-polymers thereof. In certain embodiments, the polymers are selected from the group consisting of polypropylene, polylactide, polybutadiene, styrene-butadiene rubbers, natural rubbers, and combinations or co-polymers thereof.

BRIEF DESCRIPTION OF THE FIGURES

FIG. 12 is an exemplary flowchart depicting the process and principles of the invention, in some embodiments.

DETAILED DESCRIPTION OF SOME EMBODIMENTS

Figure 1:
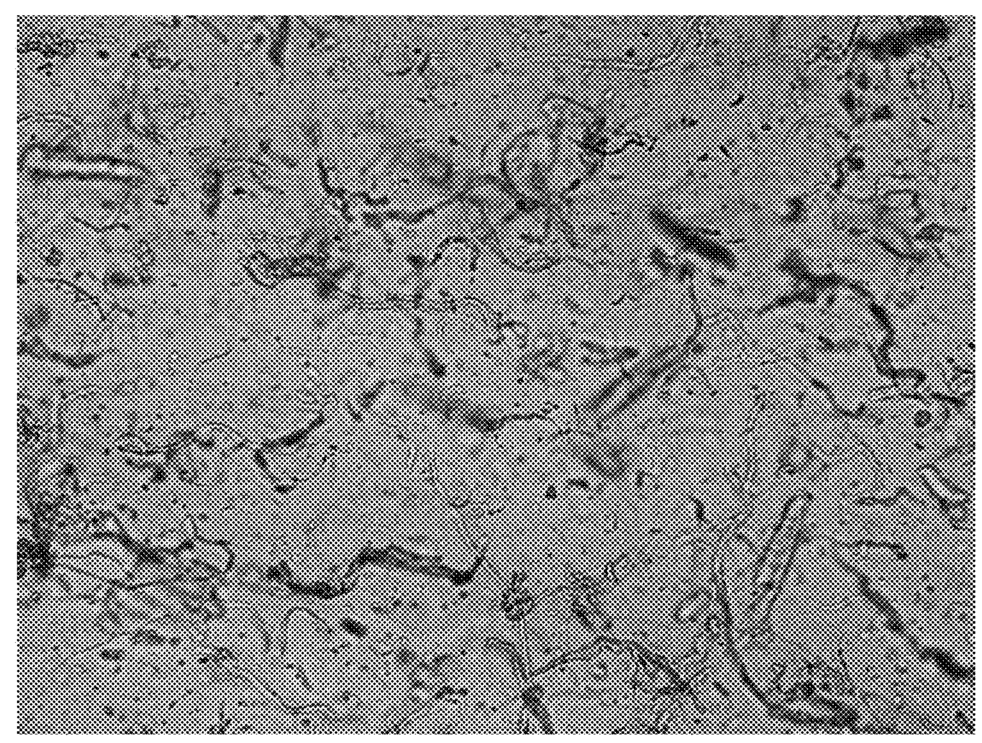
FIG. 1 is an optical micrograph (100× magnification) of the nanocellulose-polymer composite of Example 1 using a dispersion/drying agent, indicating evenly dispersed 2 wt % nanocellulose (lignin-coated nanofibrils) in polypropylene.
Figure 2:
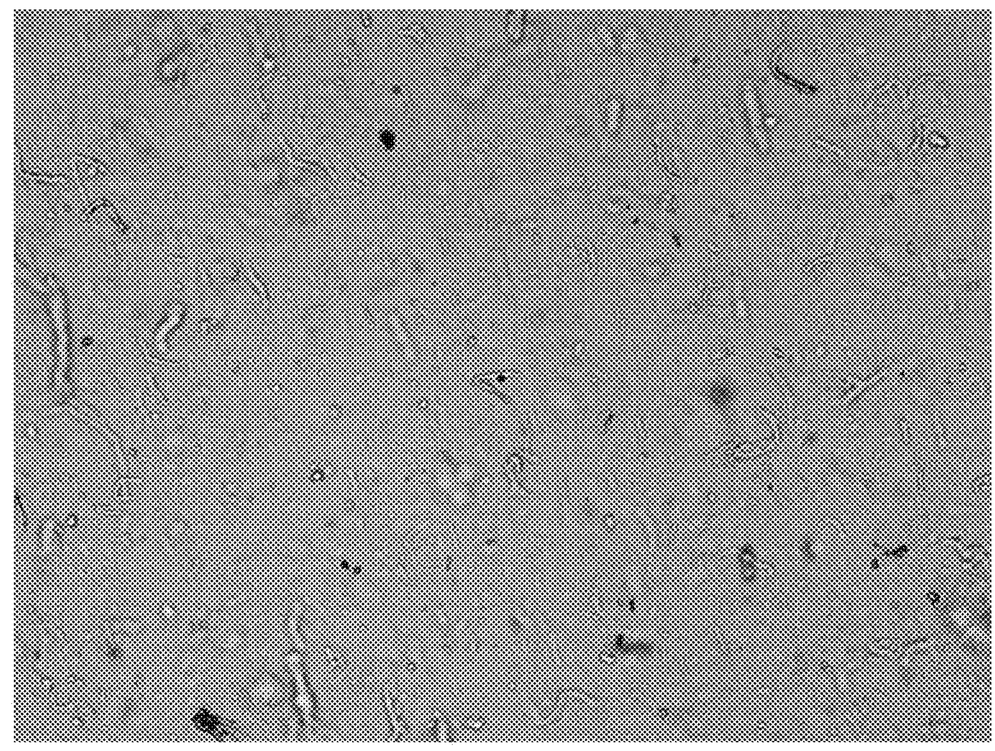
FIG. 2 is an optical micrograph (100× magnification) of the nanocellulose-polymer composite of Example 2 using a dispersion/drying agent, indicating evenly dispersed 2 wt % nanocellulose (lignin-coated nanofibrils) in polypropylene.
Figure 3:
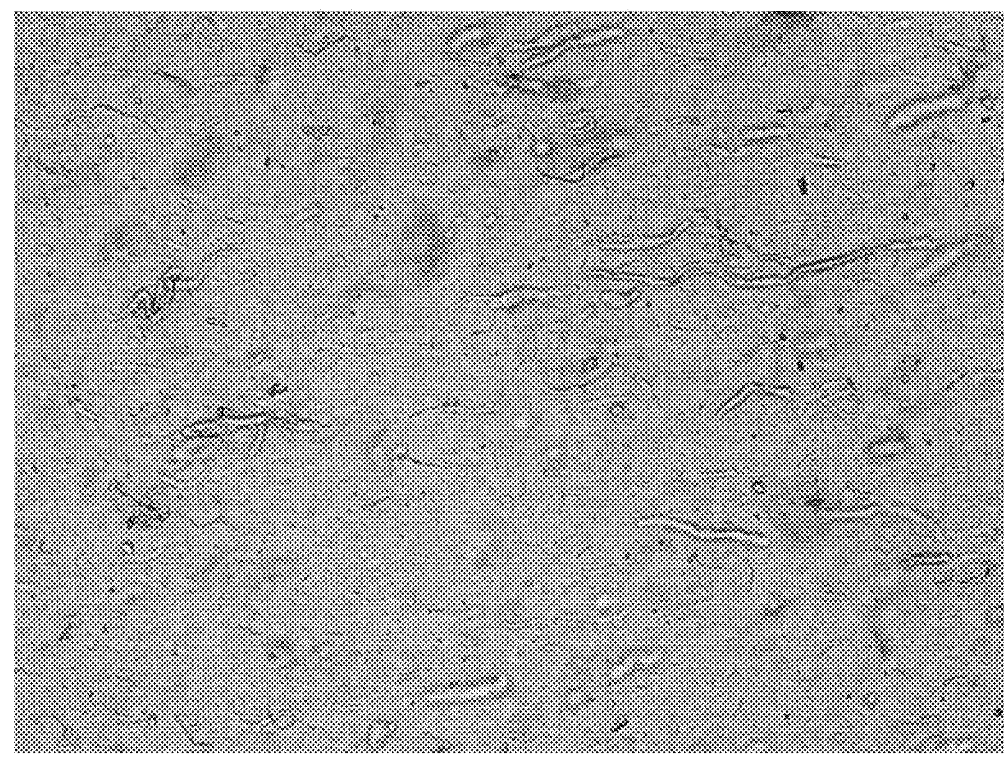
FIG. 3 is an optical micrograph (100× magnification) of the nanocellulose-polymer composite of Example 3 using a dispersion/drying agent, indicating evenly dispersed 2 wt % nanocellulose (lignin-coated nanofibrils) in polypropylene.
Figure 4:
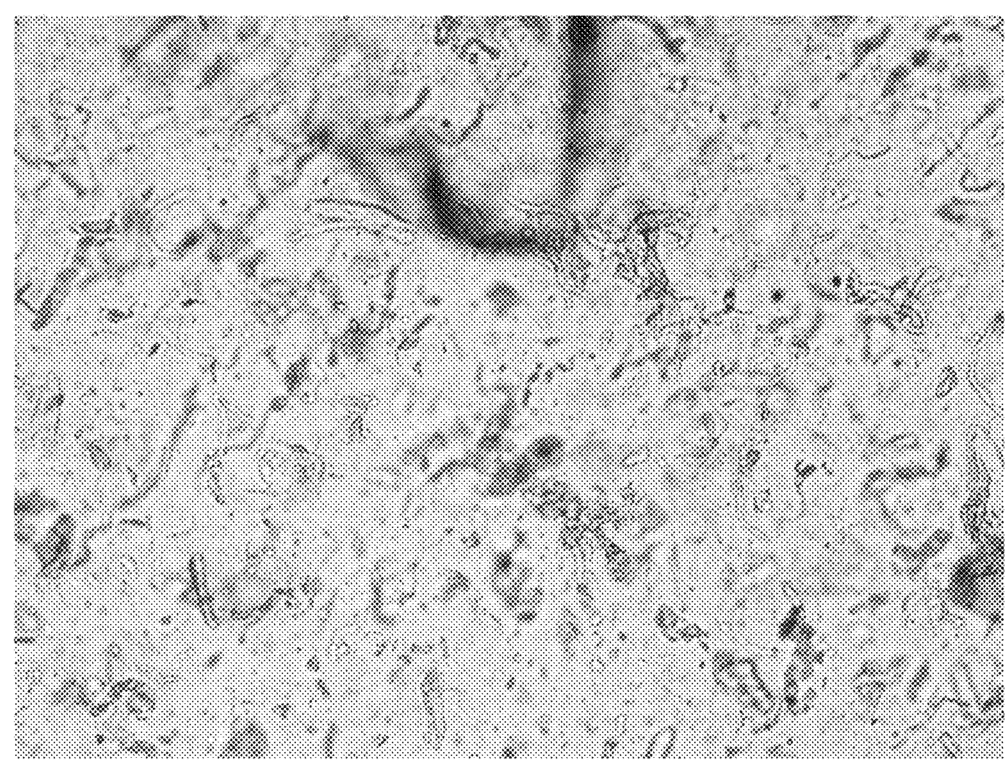
FIG. 4 is an optical micrograph (100× magnification) of the nanocellulose-polymer composite of Example 4 using a dispersion/drying agent, indicating evenly dispersed 2 wt % nanocellulose (lignin-coated nanofibrils) in polypropylene.
Figure 5:
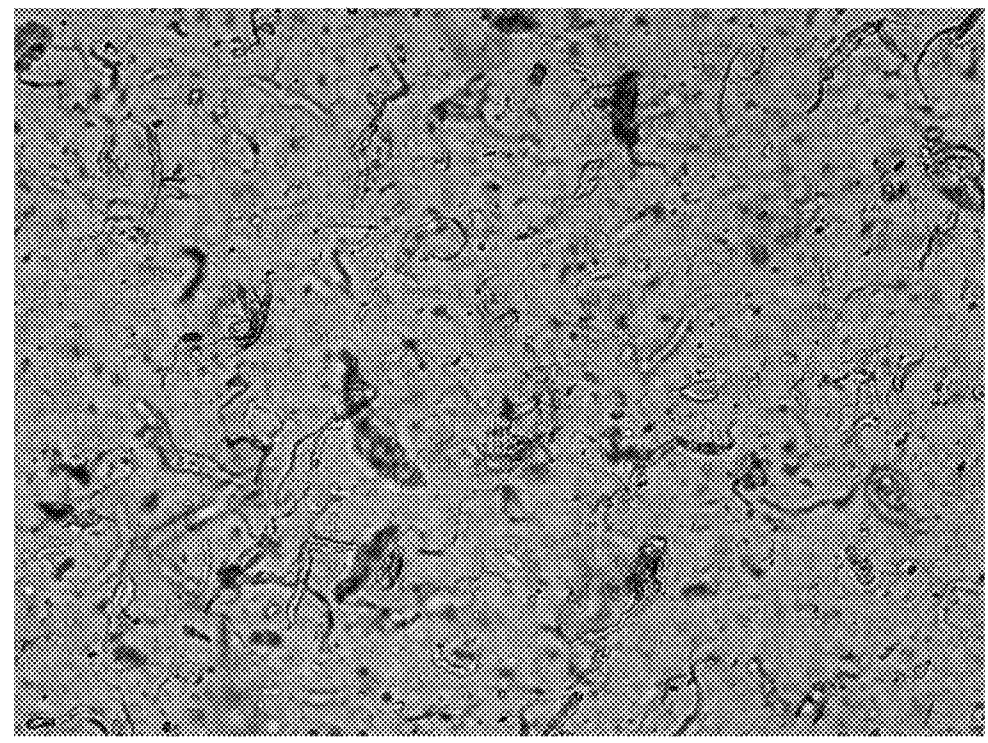
FIG. 5 is an optical micrograph (100× magnification) of the nanocellulose-polymer composite of Example 5 using a dispersion/drying agent, indicating evenly dispersed 2 wt % nanocellulose (lignin-coated nanofibrils) in polypropylene.
Figure 6:
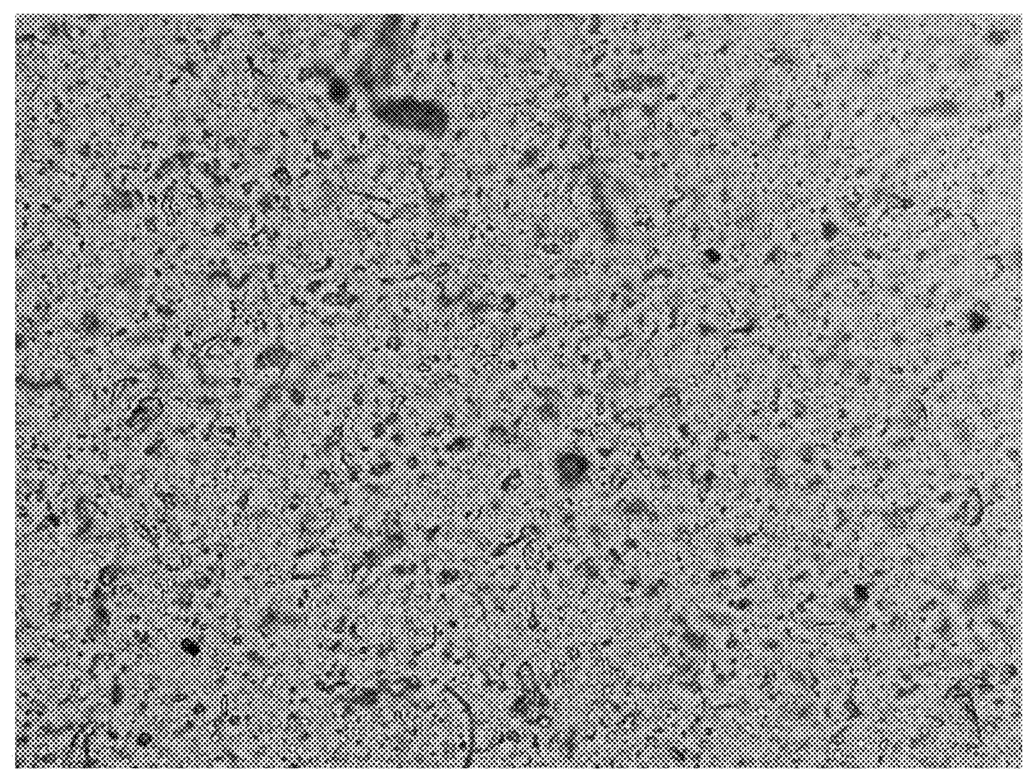
FIG. 6 is an optical micrograph (100× magnification) of the nanocellulose-polymer composite of Example 6 using a dispersion/drying agent, indicating evenly dispersed 0.5 wt % nanocellulose (lignin-coated nanocrystals) in polylactide.
Figure 7:
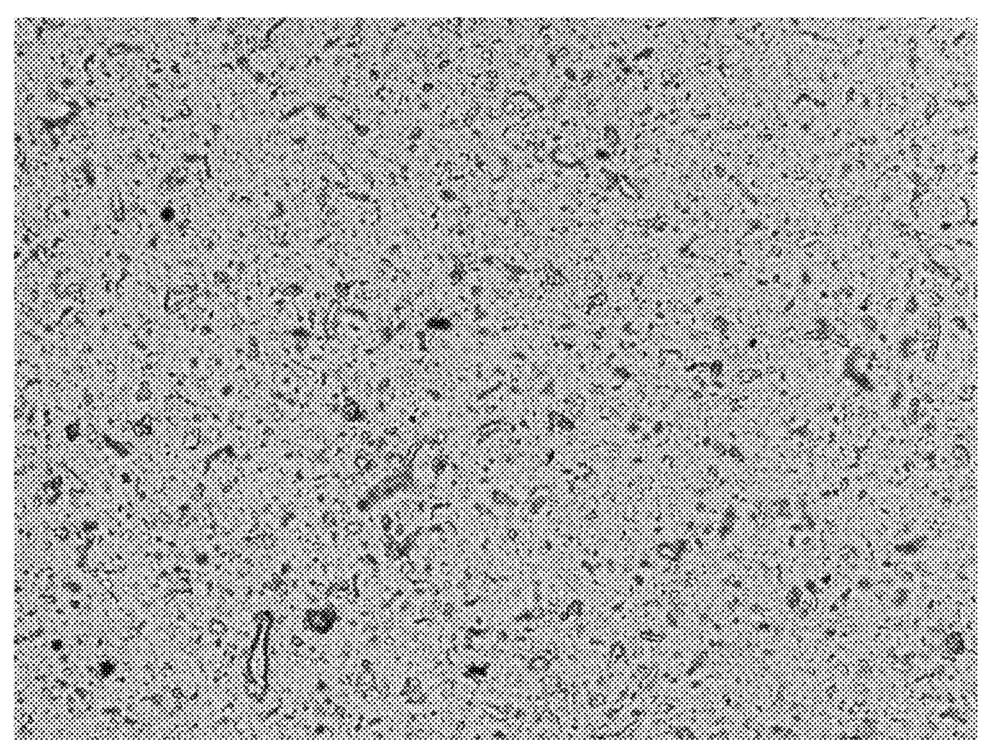
FIG. 7 is an optical micrograph (100× magnification) of the nanocellulose-polymer composite of Example 7 using a dispersion/drying agent, indicating evenly dispersed 0.5 wt % nanocellulose (lignin-coated nanocrystals) in polylactide.
Figure 8:
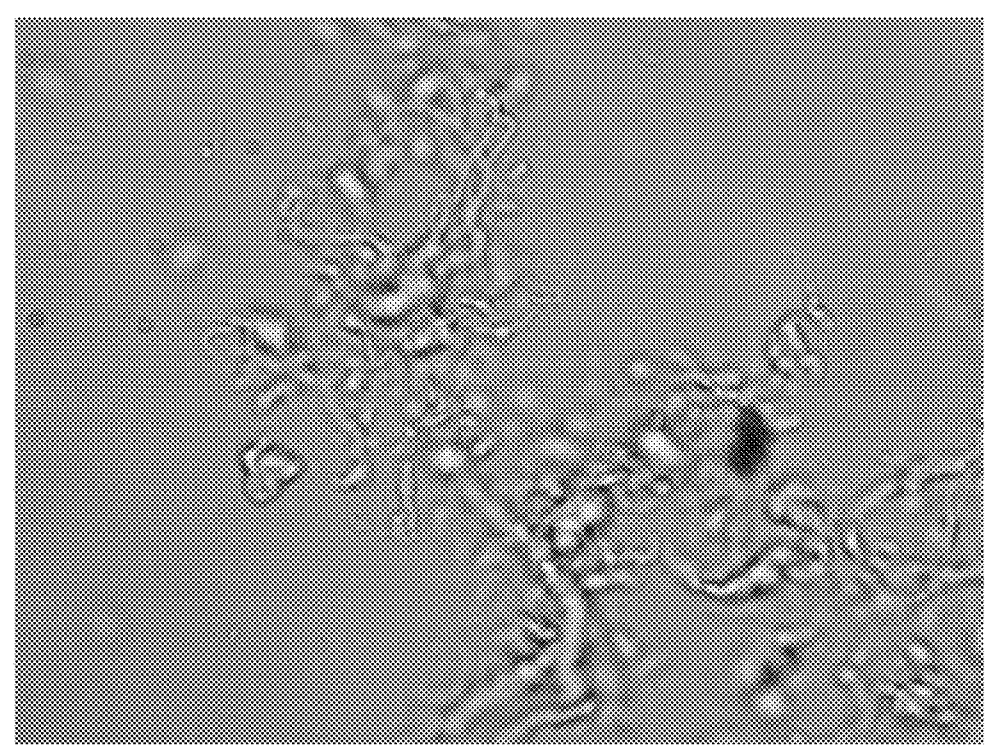
FIG. 8 is an optical micrograph (400× magnification) of the nanocellulose-containing composite of Example 8 using a dispersion/drying agent, indicating evenly dispersed 1.3 wt % nanocellulose (lignin-coated nanofibrils) in diisononyl phthalate.
Figure 9:
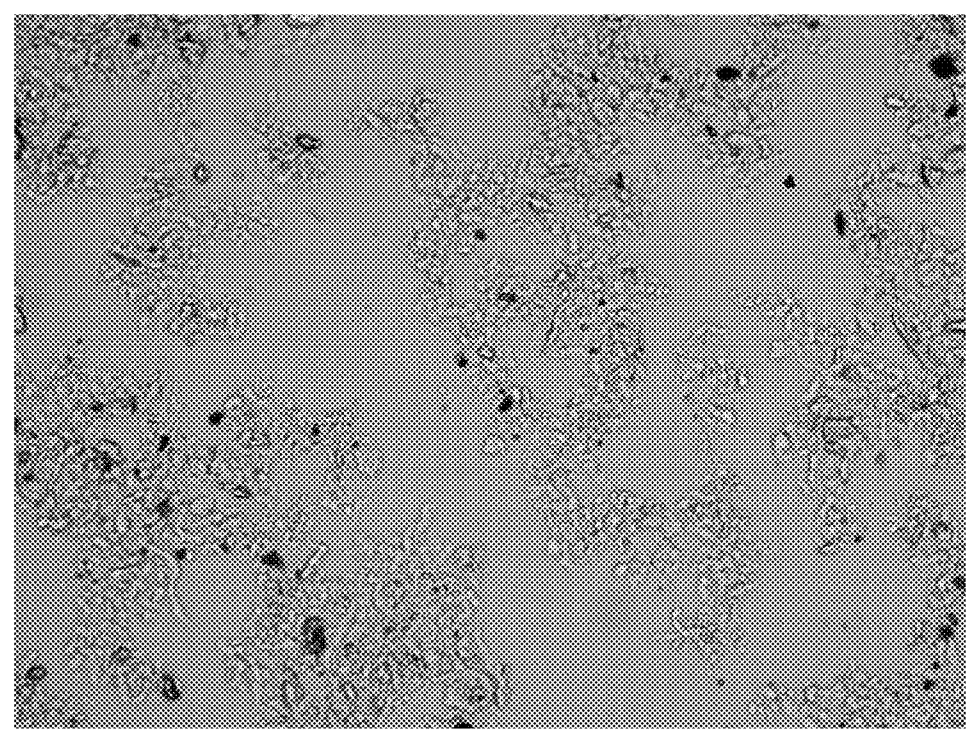
FIG. 9 is an optical micrograph (100× magnification) of as-produced, never-dried, never-concentrated 2 wt % lignin-coated nanofibrils dispersed in water.
Figure 10:
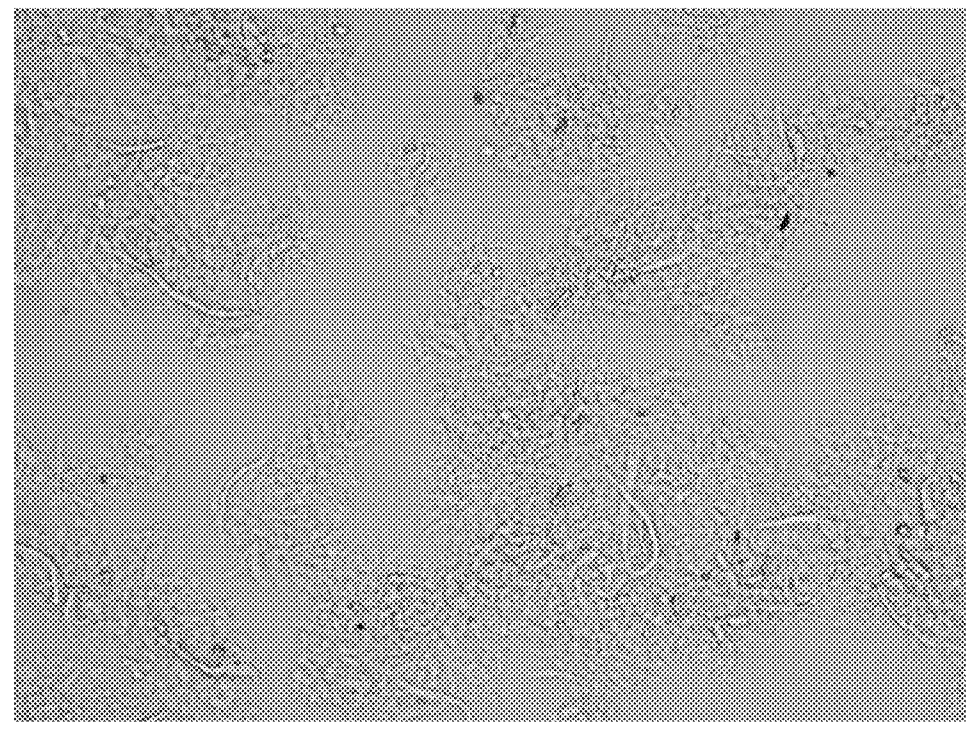
FIG. 10 is an optical micrograph (100× magnification) of as-produced, never-dried, never-concentrated 2 wt % lignin-coated nanocrystals dispersed in water.

This description enables one skilled in the art to make and use the invention, and describes several embodiments, adaptations, variations, alternatives, and uses of the invention. These and other embodiments, features, and advantages of the present invention will become more apparent to those skilled in the art when taken with reference to the following detailed description of the invention in conjunction with any accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs. All composition numbers and ranges based on percentages are weight percentages, unless indicated otherwise. All ranges of numbers or conditions are meant to encompass any specific value contained within the range, rounded to any suitable decimal point.

Unless otherwise indicated, all numbers expressing parameters, reaction conditions, concentrations of components, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of" and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

The present invention, in some variations, is predicated on the selection and incorporation of dispersion/drying agents for nanocellulose. As explained in the Background, it is often desirable for composite products to incorporate distinct nanocellulose particles and prevent those particles from bonding together (agglomerating) during production or use. Nanocellulose is typically available as an aqueous dispersion, as produced from cellulosic biomass or through bacterial synthesis. In dilute aqueous dispersions, the nanocellulose particles remain non-agglomerated or reversibly agglomerated. For most polymer systems, the aqueous dispersion itself cannot be introduced into a polymer matrix—the water needs to first be removed. Even for aqueous systems, additive products containing as little water as possible are preferred to minimize product delivery costs, spoiling, and the amount of water introduced to the end-use product system with the additive. For example it is generally unacceptable to introduce excess water into a product system along with the additive such that the product must then be dewatered or dried beyond normal levels.

A "dispersion/drying agent" as intended herein is a chemical, or combination of chemicals, that functions to prevent irreversible agglomeration of nanocellulose while it is being dried or dewatered. The dispersion/drying agent disclosed herein is selected to retain distinct nanocellulose particles by preventing bonding between nanocellulose particles while the aqueous dispersion is being dried or dewatered (water removal). Without an effective dispersion/drying agent, irreversible bonding between nanocellulose particles has been observed through drying with heat to as low as 20-30 wt % solids slurries. The dispersion/drying agent also retains distinct nanocellulose particles while the nanocellulose is being incorporated into a composite product, and effectively and easily releases the individual nanocellulose particles during composite product formulating so that the effectiveness of the nanocellulose is maximized. To reduce or prevent nanocellulose from bonding to itself during drying, a dispersion/drying agent may be selected to interact sufficiently with the surface of the nanocellulose and/or distribute uniformly between nanocellulose particles, thereby reducing or preventing nanocellulose agglomeration.

Exemplary embodiments of the invention will now be described. These embodiments are not intended to limit the scope of the invention as claimed. The order of steps may be varied, some steps may be omitted, and/or other steps may be added. Reference herein to first step, second step, etc. is for purposes of illustrating some embodiments only. Also, it should be understood that all references to "embodiments" are non-limiting and are considered to also be options with respect to any other disclosed embodiment, unless the context clearly dictates otherwise.

Some variations of the invention provide a nanocellulose-dispersion concentrate comprising:

(a) from about 5 wt % to about 90 wt % nanocellulose; and (b) from about 5 wt % to about 95 wt % dispersion/drying agent selected for compatibility with the nanocellulose, wherein the dispersion/drying agent is selected from the group consisting of waxes, polyolefins, olefin-maleic anhydride copolymers, olefin-acrylic acid copolymers, polyols, fatty acids, fatty alcohols, polyol-glyceride esters, polydimethylsiloxanes, polydimethylsiloxane-alkyl esters, polyacrylamides, starches, cellulose derivatives, particulates, and combinations or reaction products thereof, and wherein the nanocellulose-dispersion concentrate is in solid form or liquid form.

In some embodiments, the nanocellulose is present at a concentration of about 10 wt % to about 70 wt %, and the dispersion/drying agent is present at a concentration of about 5 wt % to about 50 wt %. In various embodiments, the nanocellulose is present at a concentration of about, at least about, or at most about 5, 10, 15, 20, 25, 30, 35, 40, 45, 50, 55, 60, 65, 70, 75, 80, 85, or 90 wt %, including all intervening ranges. In these or other embodiments, the dispersion/drying agent is present at a concentration of about, at least about, or at most about 5, 10, 15, 20, 25, 30, 35, 40, 45, 50, 55, 60, 65, 70, 75, 80, 85, 90, or 95 wt %, including all intervening ranges.

In some embodiments, the sum of nanocellulose and dispersion/drying agent is about, at least about, or at most about 10, 15, 20, 25, 30, 35, 40, 45, 50, 55, 60, 65, 70, 75, 80, 85, 90, 95, 99, or 100 wt %. The nanocellulose-dispersion concentrate may consist essentially of the nanocellulose and the dispersion/drying agent, i.e. without any other functional components present.

In some embodiments, the weight ratio of nanocellulose to dispersion/drying agent is selected from about 0.5 to about 2. In various embodiments, the weight ratio of nanocellulose to dispersion/drying agent is about, at least about, or at most about 0.1, 0.2, 0.5, 0.75, 0.9, 1, 1.1, 1.25, 1.5, 1.8, 2, 3, 4, 5, 6, 7, 8, 9, or 10, including all intervening ranges.

The nanocellulose may include cellulose nanocrystals, cellulose nanofibrils, or a combination of cellulose nanocrystals and cellulose nanofibrils. In some embodiments, the nanocellulose includes lignin-containing nanocellulose, such as lignin-coated nanocellulose. Various types of nanocellulose are described in more detail later.

The nanocellulose-dispersion concentrate may be completely dry, or may contain water at a concentration from about 0.1 wt % to about 70 wt %. In various embodiments, the nanocellulose-dispersion concentrate contains about, or at most about, 0.1, 0.2, 0.3, 0.4, 0.5, 1, 2, 3, 4, 5, 10, 15, 20, 25, 30, 35, 40, 45, 50, 60, or 70 wt % water, including all intervening ranges.

The nanocellulose-dispersion concentrate may further comprise a liquid solvent, such as a polar liquid solvent selected from the group consisting of water, $C_1$-$C_8$ alcohols, $C_2$-$C_8$ polyols, and combinations thereof. Additionally, or alternatively, non-polar liquid solvents may be present, such as aromatic hydrocarbons, e.g. toluene, xylenes, or lignin derivatives.

In some embodiments, the nanocellulose-dispersion concentrate further comprises an elastomer, such as a natural rubber or synthetic rubber. The concentration of elastomer in the nanocellulose-dispersion concentrate may be from about 0.1 wt % to about 50 wt %, such as about 0.1, 0.2, 0.3, 0.4, 0.5, 1, 2, 3, 4, 5, 10, 15, 20, 25, 30, 35, 40, 45, or 50 wt %.

The nanocellulose-dispersion concentrate is a composition containing nanocellulose that is redispersable in a matrix of interest (e.g., a polymer). The redispersability of the nanocellulose-dispersion concentrate may be tested or shown in other systems, such as water, propanol, or other liquids or solids that are not necessarily polymers.

In certain embodiments, the nanocellulose-dispersion concentrate is redispersed in an aqueous solution. In a typical example of such embodiments, water is removed from the starting nanocellulose gel for purposes of shipping the nanocellulose (to avoid shipping water weight), and different water is added back at a location of use. Preferably, the nanocellulose is readily dispersible in water, to form a nanocellulose gel without the need for homogenizing or other mechanical refining (other than standard industrial mixing). For example, a nanocellulose-dispersion concentrate powder may come apart very easily in water to individual nanoparticles with tank agitation, such as for 30 minutes.

The nanocellulose-dispersion concentrate may be provided in pre-packaged form. The pre-packaging may be in small containers, tubes, vials, jars, bags, supersacks, or buckets, for example, in a pre-packaging material that may be glass, plastic, coated paper, etc. In certain embodiments, the nanocellulose-dispersion concentrate is provided in powder form, such as a dry powder. In some embodiments, the nanocellulose-dispersion concentrate is part of a kit that includes pre-packaged nanocellulose-dispersion concentrate along with use instructions that are tailored for a specific masterbatch or composite system.

In the specification, a "nanocellulose-dispersion concentrate" refers to a composition containing at least nanocellulose and a dispersion/drying agent. A "nanocellulose-dispersion masterbatch" refers to a composition containing at least nanocellulose, a dispersion/drying agent, and a carrier material. As will be understood according to the present specification, a nanocellulose-dispersion concentrate may be used directly in producing a nanocellulose-containing composite product. It is beneficial to utilize a masterbatch in some embodiments of producing a nanocellulose-containing composite product.

In this specification, all references to "matrix polymer" will be understood as exemplary references to "matrix material." Likewise, all references to "carrier polymer" will be understood as exemplary references to "carrier material." While many embodiments directed to polymers are described, this patent application is expressly not limited to use of the nanocellulose-dispersion concentrate in polymer systems.

Other variations of the invention provide a nanocellulose-dispersion masterbatch comprising:

(a) from about 1 wt % to about 75 wt % nanocellulose;

(b) from about 1 wt % to about 89 wt % dispersion/drying agent selected for compatibility with the nanocellulose; and (c) from about 10 wt % to about 98 wt % carrier polymer that is different than the nanocellulose and the dispersion/drying agent, wherein the dispersion/drying agent is selected from the group consisting of waxes, polyolefins, olefin-maleic anhydride copolymers, olefin-acrylic acid copolymers, polyols, fatty acids, fatty alcohols, polyol-glyceride esters, polydimethylsiloxanes, polydimethylsiloxane-alkyl esters, polyacrylamides, starches, cellulose derivatives, particulates, and combinations or reaction products thereof, and wherein the nanocellulose-dispersion masterbatch is in solid form or liquid form.

In some masterbatch embodiments, the nanocellulose is present at a concentration of about 10 wt % to about 50 wt %, and the dispersion/drying agent is present at a concentration of about 5 wt % to about 75 wt %. In various embodiments, the nanocellulose is present at a concentration of about, at least about, or at most about 2, 3, 4, 5, 10, 15, 20, 25, 30, 35, 40, 45, 50, 55, 60, 65, 70, or 75 wt %, including all intervening ranges. In these or other embodiments, the dispersion/drying agent is present at a concentration of about, at least about, or at most about 1, 2, 3, 4, 5, 10, 15, 20, 25, 30, 35, 40, 45, 50, 55, 60, 65, 70, 75, 80, or 85 wt %, including all intervening ranges.

In some masterbatch embodiments, the sum of nanocellulose and dispersion/drying agent is about, at least about, or at most about 10, 15, 20, 25, 30, 35, 40, 45, 50, 55, 60, 65, 70, 75, 80, 85, 90, 95, 99, or 100 wt %. The nanocellulose-dispersion masterbatch may consist essentially of the nanocellulose, the dispersion/drying agent, and the carrier polymer, i.e. without any other functional components present.

In some masterbatch embodiments, the weight ratio of nanocellulose to dispersion/drying agent is selected from about 0.5 to about 2. In various embodiments, the weight ratio of nanocellulose to dispersion/drying agent is about, at least about, or at most about 0.1, 0.2, 0.5, 0.75, 0.9, 1, 1.1, 1.25, 1.5, 1.8, 2, 3, 4, 5, 6, 7, 8, 9, or 10, including all intervening ranges.

In some masterbatch embodiments, the weight ratio of carrier polymer to nanocellulose is selected from about 1 to about 100, such as about, at least about, or at most about 2, 5, 10, 20, 50, or 80, including all intervening ranges.

The dispersion/drying agent may also be selected for compatibility with the carrier polymer of the masterbatch. Alternatively, the carrier polymer may be selected for compatibility with the selected dispersion/drying agent.

The carrier polymer may be selected from the group consisting of polyolefins, polyols, polyamides, polylactide, polystyrene, polycarbonate, polyethylene terephthalate, and combinations thereof.

In preferred embodiments of the nanocellulose-dispersion masterbatch, the masterbatch is in solid, powder form. The powder may be pelletized into spheres, cylinders, plates, or other geometry.

In other embodiments, the nanocellulose-dispersion masterbatch is in liquid form or in a masterbatch solvent, such as water, $C_1$-$C_8$ alcohols, $C_2$-$C_8$ polyols, or a combination thereof. In certain embodiments, the masterbatch is in powder form but contains water or other solvent absorbed in the solids.

The nanocellulose-dispersion masterbatch may be provided in pre-packaged form. The pre-packaging may be in small containers, tubes, vials, jars, or bags, for example, in a pre-packaging material that may be glass, plastic, coated paper, etc. In certain embodiments, the nanocellulose-dispersion masterbatch is provided in powder form, such as a dry powder. In other embodiments, the nanocellulose-dispersion masterbatch is pelletized or compressed into various geometries, such as spheres, beads, rods, cylinders, plates, etc. In some embodiments, the nanocellulose-dispersion masterbatch is part of a kit that includes pre-packaged nanocellulose-dispersion masterbatch along with use instructions that are tailored for a specific composite system.

Other variations of the invention provide a nanocellulose-polymer composite product comprising:

(a) from about 0.05 wt % to about 10 wt % nanocellulose;
(b) from about 0.05 wt % to about 10 wt % dispersion/drying agent selected for compatibility with the nanocellulose and with the nanocellulose-polymer composite product, wherein the dispersion/drying agent is selected from the group consisting of waxes, polyolefins, olefin-maleic anhydride copolymers, olefin-acrylic acid copolymers, polyols, fatty acids, fatty alcohols, polyol-glyceride esters, polydimethylsiloxanes, polydimethylsiloxane-alkyl esters, polyacrylamides, starches, cellulose derivatives, particulates, and combinations or reaction products thereof;
(c) from about 0.1 wt % to about 10 wt % carrier polymer selected for compatibility with the nanocellulose and the dispersion/drying agent; and
(d) from about 50 wt % to about 99.8 wt % matrix polymer.

In some embodiments of the composite product, the nanocellulose is present at a concentration of about 0.1 wt % to about 5 wt % in the nanocellulose-polymer composite product. The dispersion/drying agent may be present at a concentration of about 0.1 wt % to about 5 wt %. In various composite products, the nanocellulose is present at a concentration of about, at least about, or at most about 0.05, 0.1, 0.2, 0.3, 0.4, 0.5, 0.6, 0.7, 0.8, 0.9, 1, 2, 3, 4, 5, 6, 7, 8, 9, or 10 wt %, including all intervening ranges. In these or other embodiments, the dispersion/drying agent is present at a concentration of about, at least about, or at most about 0.05, 0.1, 0.2, 0.3, 0.4, 0.5, 0.6, 0.7, 0.8, 0.9, 1, 2, 3, 4, 5, 6, 7, 8, 9, or 10 wt %, including all intervening ranges.

In some composite products, the sum of nanocellulose and dispersion/drying agent is about, at least about, or at most about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, or 20 wt %. The nanocellulose-polymer composite product may consist essentially of the nanocellulose, the dispersion/drying agent, the carrier polymer, and the matrix polymer, i.e. without any other functional components present.

In some composite products, the weight ratio of nanocellulose to dispersion/drying agent is selected from about 0.5 to about 2. In various composite products, the weight ratio of nanocellulose to dispersion/drying agent is about, at least about, or at most about 0.1, 0.2, 0.5, 0.75, 0.9, 1, 1.1, 1.25, 1.5, 1.8, 2, 3, 4, 5, 6, 7, 8, 9, or 10, including all intervening ranges.

In some composite products, the weight ratio of carrier polymer to nanocellulose is selected from about 1 to about 100, such as about, at least about, or at most about 2, 5, 10, 20, 50, or 80, including all intervening ranges.

In some composite products, the weight ratio of matrix polymer to nanocellulose is selected from about 5 to about 2000, such as about, at least about, or at most about 5, 10, 50, 100, 200, 500, 1000, 1500, or 2000, including all intervening ranges.

In some composite products, the weight ratio of matrix polymer to nanocellulose-dispersion concentrate is selected from about 1 to about 10000, such as about, at least about, or at most about 2, 10, 50, 100, 500, 1000, 2000, 3000, 4000, 5000, 6000, 7000, 8000, or 9000, including all intervening ranges.

In some composite products, the weight ratio of matrix polymer to nanocellulose-dispersion masterbatch is selected from about 2 to about 10000, such as about, at least about, or at most about 5, 10, 50, 100, 500, 1000, 2000, 3000, 4000, 5000, 6000, 7000, 8000, or 9000, including all intervening ranges.

In some embodiments of the composite product, the dispersion/drying agent is also selected for compatibility with the carrier polymer, the matrix polymer, or both of these. Alternatively, or additionally, the carrier polymer may be selected for compatibility with the dispersion/drying agent and/or the matrix polymer.

The carrier polymer may be selected from the group consisting of polyolefins, polyols, polyamides, polylactide, polystyrene, polycarbonate, polyethylene terephthalate, and combinations thereof. The carrier polymer may be the same polymer as the matrix polymer. Alternatively, the carrier polymer may be a different polymer compared to the matrix polymer. It is also possible to replace the carrier polymer with a carrier material that is not a polymer. For example, the carrier material may be an organic liquid, an organic solid, an inorganic liquid, an inorganic solid, or a combination thereof.

In various nanocellulose-polymer composite products, the matrix polymer is selected from the group consisting of polyolefins, polyols, polyesters, polyamides, polylactide, polystyrene, polycarbonates, polyacrylates, polystyrenes, styrenic rubbers, natural rubbers, synthetic rubbers, polyurethanes, polyureas, poly(amide-enamine)s, polyanhydrides, polyhydroxyalkanoates, poly(alkene dicarboxylate)s, silicones, carbonaceous polymers, and combinations or co-polymers thereof.

Still other variations of the invention provide a nanocellulose-polymer composite product comprising:

(a) from about 0.05 wt % to about 15 wt % nanocellulose;
(b) from about 0.05 wt % to about 15 wt % dispersion/drying agent selected for compatibility with the nanocellulose and with the nanocellulose-polymer composite product, wherein the dispersion/drying agent is selected from the group consisting of waxes, polyolefins, olefin-maleic anhydride copolymers, olefin-acrylic acid copolymers, polyols, fatty acids, fatty alcohols, polyol-glyceride esters, polydimethylsiloxanes, polydimethylsiloxane-alkyl esters, polyacrylamides, starches, cellulose derivatives, particulates, and combinations or reaction products thereof; and
(c) from about 50 wt % to about 99.9 wt % matrix polymer.

In some embodiments, there is no carrier polymer, such as when the nanocellulose-dispersion concentrate is incorporated directly into a matrix polymer, without proceeding through a masterbatch. It is also possible, in certain embodiments, for a carrier polymer to be selectively removed, such as by hydrolysis or melting, from a composite product.

In some embodiments of the composite product not containing a carrier polymer, the nanocellulose is present at a concentration of about 0.1 wt % to about 5 wt %, such as from about 0.5 wt % to about 2 wt %, in the nanocellulose-polymer composite product. The nanocellulose-polymer composite product may consist essentially of the nanocellulose, the dispersion/drying agent, and the matrix polymer.

In some composite products not containing a carrier polymer, the weight ratio of matrix polymer to nanocellulose is selected from about 2 to about 2000, such as about, at least about, or at most about 5, 10, 50, 100, 200, 500, 1000, 1500, or 2000, including all intervening ranges.

In some composite products not containing a carrier polymer, the weight ratio of matrix polymer to nanocellulose-dispersion concentrate is selected from about 1 to about 10000, such as about, at least about, or at most about 2, 5, 10, 50, 100, 500, 1000, 2000, 3000, 4000, 5000, 6000, 7000, 8000, or 9000, including all intervening ranges.

The dispersion/drying agent is selected based on compatibility with the selected nanocellulose and the end-use product. In some embodiments, a dispersion/drying agent contains chemical component(s) and/or functional group(s) that are capable of hydrogen bonding with polar groups present in nanocellulose. Nanocellulose polar groups include at least —OH and, to some extent, —O—; other polar groups may be present if functionalized nanocellulose is utilized. In other embodiments, a dispersion/drying agent is not necessarily capable of hydrogen bonding with polar groups present in nanocellulose. In these or other embodiments, the dispersion/drying agent contains components that act as particle spacers. The particle spacers not only physically partition the nanocellulose particles, but also do not repel the nanocellulose phase. This is important, because repelling nanocellulose causes the nanocellulose to associate and agglomerate with itself, which leads to irreversible bonding during drying. Rather, the particle spacers within the dispersion/drying agent prevent the nanocellulose from associating in this way, thereby reducing or preventing irreversible agglomeration.

The dispersion/drying agent may also be selected based on economics (cost or availability), ability to manufacture it as a co-product on site, or for its environmental sustainability. In some embodiments, the dispersion/drying agent is bio-based, biodegradable, and/or compostable.

In some embodiments, the dispersion/drying agent is a functionalized polyalkylene wax that is functionalized for compatibility with the nanocellulose and optionally with the nanocellulose-polymer composite product. As used herein, a "functionalized" hydrogen-containing compound is one in which at least one hydrogen atom is replaced by a functional group. For example, —H may be replaced by —OH, —COOH, =O, or other oxygen-containing functional groups. In certain embodiments, —H may be replaced by non-oxygen-containing functional groups, such as metals, halogens, nitrogen, sulfur, or groups containing these components, for example.

The functionalized polyalkylene wax may be a functionalized polyethylene wax, a functionalized polypropylene wax, a functionalized polybutylene wax, or a combination thereof. In certain embodiments, the dispersion/drying agent is a low-molecular weight oligomer or polymer of ethylene or functionalized ethylene. When functionalized ethylene is utilized, each repeat unit may have an average of about 0.1 to about 4.0 hydrogen atoms replaced by other functional groups. The number-average degree of polymerization of the ethylene or functionalized ethylene may be from 2 to 1000, such as from 5 to 500. In various embodiments, the number-average degree of polymerization of the ethylene or functionalized ethylene is, is at least, or is at most 2, 3, 4, 5, 6, 7, 8, 9, 10, 11, 12, 13, 14, 15, 25, 50, 75, 100, 150, 200, 300, 400, 500, 600, 700, 800, 900, or 1000, including all intervening ranges.

In some embodiments, the dispersion/drying agent is a copolymer of (a) one or more $C_2$-$C_4$ olefins and (b) maleic anhydride. $C_2$ olefin is ethylene, $C_3$ olefin is propylene, and $C_4$ olefin is 1-butene, 2-butene, isobutene, butadiene, or a combination thereof. The $C_2$-$C_4$ olefins may be functionalized olefins, such as functionalized ethylene. Maleic anhydride is an organic compound with the formula $C_2H_2(CO)_2O$ and is the acid anhydride of maleic acid. For purposes herein, a polymer of maleic acid, or a salt thereof, is deemed to be also a polymer of maleic anhydride. The maleic anhydride may be produced from 5-hydroxymethylfurfural, which may itself be derived from biomass (glucose dehydration), for example. The $C_2$-$C_4$ olefins may also be produced from biomass, such as via dehydration of alcohols that are produced by fermentation of sugar.

The copolymer of a $C_2$-$C_4$ olefin and maleic anhydride may be a block copolymer, an alternating copolymer, a random copolymer, or a combination thereof. In the case of the olefin being ethylene, for example, the copolymer may be poly(ethylene-alt-maleic anhydride) and/or poly(ethylene-graft-maleic anhydride). A graft copolymer is a type of copolymer in which one or more blocks of homopolymer are grafted as branches onto a main chain, meaning it is a branched copolymer with one or more side chains of a homopolymer attached to the backbone of the main chain. As such, poly(ethylene-graft-maleic anhydride) can also be considered a polymer of functionalized ethylene in which ethylene is functionalized with maleic acid or maleic anhydride. This type of copolymer may also be referred to as maleated polyethylene.

In some embodiments, the dispersion/drying agent is a copolymer of (a) one or more $C_2$-$C_4$ olefins and (b) acrylic acid. $C_2$ olefin is ethylene, $C_3$ olefin is propylene, and $C_4$ olefin is 1-butene, 2-butene, isobutene, butadiene, or a combination thereof. The $C_2$-$C_4$ olefins may be functionalized olefins, such as functionalized ethylene. Acrylic acid is an organic compound with the formula $CH_2{=}CHCOOH$. For purposes herein, a polymer of acrylic acid, or a salt thereof, is deemed to be also a polymer of acrylic anhydride.

The copolymer of a $C_2$-$C_4$ olefin and acrylic acid may be a block copolymer, an alternating copolymer, a random copolymer, or a combination thereof. Typically, the acrylic acid polymerizes across its double bond, similar to ethylene polymerization (e.g., in free-radical copolymerization), resulting in a copolymer that can be considered a graft copolymer or a polymer of functionalized ethylene in which ethylene is functionalized with acrylic acid.

In some embodiments, the dispersion/drying agent includes a polyol selected from ethylene glycol, polyethylene glycol, propylene glycol, polypropylene glycol, glycerol, butylene glycol, polybutylene glycol, butanediol, or a combination thereof. In some embodiments, the polyol is esterified with a fatty acid, such as stearic acid.

In certain embodiments, the dispersion/drying agent is or includes glycerol, or is dissolved in glycerol as a solvent. Glycerol has a high boiling temperature (about 290° C.), and three hydroxyl groups (one OH group per C atom). As nanocellulose is dried, glycerol can insert between nanocellulose particles by forming hydrogen bonds, which block the H-bonding formation, and resulting agglomeration, that would otherwise occur between nanocellulose particles. The high boiling temperature of glycerol is beneficial for use in dry powders. The powders may be dispersed in a hydrophobic polymer matrix such as polylactide (PLA). The glycerol between nanocellulose particles may function as a plasticizer as PLA is extrusion-processed, or the glycerol may be removed by vacuum during processing, or a combination thereof.

The dispersion/drying agent may be a polar molecule that has a vapor pressure less than 1.0 bar at 100° C. and optionally a vapor pressure greater than 0.001 bar, greater than 0.01 bar, or greater than 0.1 bar at 180° C. Relatively high vapor pressures at elevated temperatures can be beneficial when it is desired to remove the dispersion/drying agent during final polymer compounding, for example. The polar additive may be a polyol, such as ethylene glycol, glycerol, butanediol, etc. In some embodiments, the polar additive contains at least 0.5 OH groups per carbon atom, such as at least 1.0 OH groups per carbon atom. The OH groups prevent irreversible bonding between nanoparticles during drying. The polar additive may be organic or inorganic.

In some embodiments, the dispersion/drying agent includes a fatty acid. A fatty acid is a carboxylic acid with a long aliphatic chain, either saturated or unsaturated. Most naturally occurring fatty acids have an unbranched chain of an even number of carbon atoms, from 4 to 28. The fatty acid herein may be selected from caprylic acid, capric acid, lauric acid, stearic acid, arachidic acid, behenic acid, lignoceric acid, cerotic acid, or a combination thereof, for example. Fatty acids that are unsaturated and/or branched may be employed.

In some embodiments, the dispersion/drying agent includes a fatty alcohol. A fatty alcohol is a long-chain alcohol that is a straight-chain primary alcohol, ranging from 4 to 26 carbon atoms. Exemplary fatty alcohols include lauryl alcohol (dodecanol), stearyl alcohol, and oleyl alcohol. Fatty alcohols may be oily liquids (for smaller carbon numbers) or waxy solids. Fatty alcohols typically have an even number of carbon atoms and a single alcohol group (—OH) attached to the terminal carbon. Some are unsaturated and some are branched. Fatty alcohols that are unsaturated and/or branched may be employed. Fatty alcohols with an odd number of carbon atoms may be employed. Ethylene may be oligomerized and the oligomer subjected to hydroformylation, generating an odd-numbered aldehyde, which may subsequently be hydrogenated. For example, from 1-decene, hydroformylation gives the $C_{11}$ alcohol.

In some embodiments, the dispersion/drying agent includes a siloxane-based additive. The siloxane-based additive may include a siloxane or polysiloxane material having one or more functional groups selected from the group consisting of methyl, $C_2$-$C_{24}$ alkyl, epoxide, hydroxy, amino, carboxyl, acrylate, and combinations thereof. An exemplary siloxane-based additive is polydimethylsiloxane.

A siloxane-based additive preferably provides a hydrophobic portion and a hydrophilic portion. Typically the hydrophobic and hydrophilic portions are at opposite ends of a molecule or polymer chain. The siloxane-based additive is preferably present as an emulsion in water. In certain embodiments, the dispersion/drying agent includes an alkyl ester polydimethylsiloxane emulsion. During drying of nanocellulose with an emulsion, the nanocellulose surrounds the oil-phase drops during drying and then when the water is removed, the nanocellulose gets dragged into the oil phase. In certain embodiments, the siloxane-based additive functions as a hydrogen-bonding blocking aid during drying.

In some embodiments, the dispersion/drying agent includes starch, such as cationic starch, amphoteric starch, thermoplastic starch, or a combination thereof.

Cationic starch is positively charged, which can be desirable when nanocellulose particles have slight negative surface charges. Exemplary cationic starches include quaternary ammonium cationic starch and tertiary amino cationic starch.

Amphoteric starch is a modified starch that contains positively and negatively charged substituent groups. An exemplary amphoteric starch contains quaternary ammonium cationic groups and phosphates as anionic groups.

Thermoplastic starch is starch that has been plasticized by relatively low levels (e.g., 15-30 wt %) of molecules that are capable of hydrogen bonding with the starch hydroxyl groups. The starch plasticizers may be water, polyols (e.g., glycerol), pentaerythritol, sugar alcohols (e.g., sorbitol), poly(oxyethylene)s, poly(oxypropylene)s, non-ionic surfactants, anionic surfactants, or a combination thereof.

In some embodiments, the dispersion/drying agent includes a particulate. The particulate may be selected from, but is not limited to, clay, nano-clay, talc, wollastonite, calcium carbonate (e.g., precipitated calcium carbonate), silica, mica, kaolin, nickel, glass fibers, bentonite, biotite, illite, kaolin, vermiculite, zeolite, carbon fibers, carbon nanotubes, graphene, or a combination thereof. In some embodiments, the particulate has a surface charge, which is preferably a positive charge. Known surface treatments may be used to provide a surface charge on the particulate, such as an acidic solution treatment at low pH. Other surface treatments for particulates may be done, such as silylation to improve interfacial adhesion.

In certain embodiments, the dispersion/drying agent includes at least one fatty acid and at least one particulate. The fatty acid and particulate may be present in non-reacted form or may be reacted with each other in the dispersion/drying agent. In these embodiments, the dispersion/drying agent may include (a) a fatty acid selected from caprylic acid, capric acid, lauric acid, stearic acid, arachidic acid, behenic acid, lignoceric acid, cerotic acid, or a combination thereof, and (b) clay, nano-clay, talc, wollastonite, calcium carbonate, silica, mica, kaolin, limonite, glass fibers, bentonite, biotite, illite, kaolin, vermiculite, zeolite, or a combination thereof, for example. An exemplary dispersion/drying agent with both a fatty acid and a particulate includes talc and stearic acid. Another exemplary dispersion/drying agent with both a fatty acid and a particulate includes calcium carbonate and stearic acid.

In various embodiments, the dispersion/drying agent includes an ionomer in association with a metal cation, such as calcium or zinc, forming a neutral salt. In various embodiments, the dispersion/drying agent includes a component with a positive charge (such as a surface-charged particulate or cationic starch) in association with an anion, forming a neutral salt.

The dispersion/drying agent should be selected based on the nature of the nanocellulose to be dispersed and dried. In particular, the hydrophilicity of the nanocellulose will dictate, at least in part, the suitable dispersion/drying agents. The composition, particle size, melting point, and other factors may also be considered in selecting suitable dispersion/drying agents.

A hydrophilic molecule or portion of a molecule is one whose interactions with water and other polar substances are more thermodynamically favorable than their interactions with oil or other hydrophobic solvents. Hydrophilic molecules are typically charge-polarized and capable of hydrogen bonding. Hydrophobic molecules, on the other hand, are not attracted to water or other polar molecules. Nanocellulose is typically highly hydrophilic, but not always. In some embodiments, for example, lignin-containing nanocellulose is relatively hydrophobic. Even in lignin-containing nanocellulose, there will usually still be some hydrophilic character since lignin itself is not purely hydrophobic.

In preferred embodiments, the hydrophilicity of the dispersion/drying agent (or a portion of the agent) is selected to match, or be similar to, the hydrophilicity of the nanocellulose, so that they phase-associate and the dispersion/drying agent spaces apart regions of nanocellulose.

In some embodiments, the hydrophilicity of the dispersion/drying agent is also selected based on, at least in part, the hydrophilicity of the carrier polymer in the masterbatch and/or the matrix polymer (or other matrix material) in the final composite. The dispersion/drying agent may be designed to have both hydrophilic and hydrophobic components, such as at the two ends of the molecules. In such embodiments, for example, the hydrophilic end attaches to the nanocellulose surface while the hydrophobic end grabs onto the hydrophobic polymer during compounding.

In some embodiments, the dispersion/drying agent is selected based on its melting point. In these embodiments, the dispersion/drying agent melts, at least partially, during drying of the nanocellulose-dispersion concentrate. As the dried nanocellulose-dispersion concentrate is cooled, the dispersion/drying agent returns to a solid phase in which nanocellulose is evenly dispersed. As one example, polyethylene waxes (including functionalized variants) have melting points approximately in the range of 100-150° C.

In various embodiments, the dispersion/drying agent is selected from the group consisting of waxes, polyolefins, olefin-maleic anhydride copolymers, olefin-acrylic acid copolymers, polyols, fatty acids, fatty alcohols, polyol-glyceride esters, polydimethylsiloxanes, polydimethylsiloxane-alkyl esters, polyacrylamides, starches, cellulose derivatives, particulates, succinic anhydride, alkenylsuccinic anhydrides, alkyl ketene dimers, olefin-styrene copolymers, olefin-glycidyl copolymers, olefin-methacrylate copolymers, olefin-styrene-glycidyl copolymers, olefin-glycidyl-methacrylate copolymers, olefin-styrene-glycidyl-methacrylate copolymers, and combinations or reaction products thereof.

The dispersion/drying agent may have other functions besides enhancing dispersion of nanocellulose. For example, in some embodiments, the dispersion/drying agent may function as a compatibilizer (between matrix polymer and nanocellulose), a plasticizer, a density modifier, a viscosity modifier, or a toughness modifier. The dispersion/drying agent may also provide ancillary attributes, such as color or texture, to the final composite product or to a masterbatch.

In some variations, a compatibilizer is used in a nanocellulose-containing composite product, whether or not a masterbatch or concentration was first made. The compatibilizer may be included in a masterbatch or concentration, may be added to nanocellulose prior to addition to a matrix material, may be added to a matrix material prior to addition to nanocellulose, or may be added directly to a mixture of matrix material and nanocellulose.

Some variations provide a nanocellulose-containing composite product comprising:

(a) from about 0.05 wt % to about 50 wt % nanocellulose;

(b) from about 0.05 wt % to about 10 wt % compatibilizer, wherein the compatibilizer is selected from the group consisting of waxes, polyolefins, olefin-maleic anhydride copolymers, olefin-acrylic acid copolymers, polyols, fatty acids, fatty alcohols, polyol-glyceride esters, polydimethylsiloxanes, polydimethylsiloxane-alkyl esters, polyacrylamides, starches, cellulose derivatives, particulates, succinic anhydride, alkenylsuccinic anhydrides, alkyl ketene dimers, olefin-styrene copolymers, olefin-glycidyl copolymers, olefin-methacrylate copolymers, olefin-styrene-glycidyl copolymers, olefin-glycidyl-methacrylate copolymers, olefin-styrene-glycidyl-methacrylate copolymers, and combinations or reaction products thereof;

(c) from about 50 wt % to about 99.9 wt % matrix material.

Some variations of the invention provide a nanocellulose-containing composite product comprising:

(a) from about 0.05 wt % to about 50 wt % nanocellulose;

(b) from about 0.05 wt % to about 10 wt % compatibilizer, wherein the compatibilizer is selected from the group consisting of succinic anhydride, alkenylsuccinic anhydrides, alkyl ketene dimers, olefin-styrene copolymers, olefin-glycidyl copolymers, olefin-methacrylate copolymers, olefin-styrene-glycidyl copolymers, olefin-glycidyl-methacrylate copolymers, olefin-styrene-glycidyl-methacrylate copolymers, and combinations or reaction products thereof;

(c) from about 50 wt % to about 99.9 wt % matrix material.

In some embodiments, the nanocellulose is present at a concentration of about 0.1 wt % to about 5 wt % in the nanocellulose-containing composite product.

In some embodiments, the weight ratio of the nanocellulose to the compatibilizer is selected from about 0.1 to about 10.

In some embodiments, the nanocellulose-polymer composite product consists essentially of the nanocellulose, the compatibilizer, and the matrix material.

The nanocellulose may include cellulose nanocrystals, cellulose nanofibrils, microfibrillated cellulose, or a combination thereof. The nanocellulose may include or consist essentially of lignin-containing nanocellulose. The nanocellulose may include or consist essentially of lignin-coated nanocellulose.

In some embodiments, the compatibilizer is selected from alkenylsuccinic anhydrides, such as those having the formula:

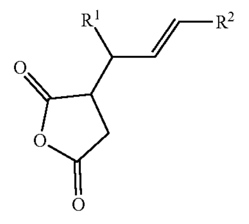

wherein $R^1$ is selected from H, $C_1$-$C_{24}$ linear or branched alkanes, $C_2$-$C_{24}$ linear or branched alkenes, $C_6$-$C_{24}$ linear or branched aromatics, or a combination thereof; and wherein $R^2$ is selected from H, $C_1$-$C_{24}$ linear or branched alkanes, $C_2$-$C_{24}$ linear or branched alkenes, $C_6$-$C_{24}$ linear or branched aromatics, or a combination thereof.

In some embodiments using alkenylsuccinic anhydrides, $R^1$ is selected from $C_2$-$C_{24}$ linear or branched alkanes, $C_4$-$C_{24}$ linear or branched alkenes, $C_8$-$C_{24}$ linear or branched aromatics, or a combination thereof; and $R^2$ is selected from $C_2$-$C_{24}$ linear or branched alkanes, $C_4$-$C_{24}$ linear or branched alkenes, $C_8$-$C_{24}$ linear or branched aromatics, or a combination thereof. In certain embodiments, $R^1$ is selected from $C_5$-$C_{15}$ linear or branched alkanes; and $R^2$ is selected from $C_5$-$C_{15}$ linear or branched alkanes.

Succinic anhydride may be prepared by catalytically hydrogenating the C═C double bond in maleic anhydride, for example. Succinic anhydride also may be prepared by dehydrating succinic acid, which itself may be produced via fermenting biomass-derived sugars using a suitable microorganism.

Alkenylsuccinic anhydrides may be prepared by reacting maleic anhydride with olefins having the desired chain length. The C═C double bond becomes a single C—C bond, but since there is at least one C═C double bond in the olefin reactant, that double bond survives and is present in the alkenylsuccinic anhydride.

In some embodiments, the compatibilizer is selected from alkyl ketene dimers, such as those having the formula:

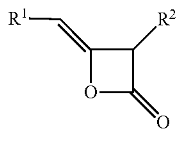

wherein $R^1$ is selected from $C_4$-$C_{24}$ linear or branched alkanes, $C_4$-$C_{24}$ linear or branched alkenes, $C_6$-$C_{24}$ linear or branched aromatics, or a combination thereof; and wherein $R^2$ is selected from $C_4$-$C_{24}$ linear or branched alkanes, $C_4$-$C_{24}$ linear or branched alkenes, $C_6$-$C_{24}$ linear or branched aromatics, or a combination thereof.

Alkyl ketene dimers are a family of organic compounds based on the 4-membered ring system of oxetan-2-one. In some embodiments using alkyl ketene dimers, $R^1$ is selected from $C_8$-$C_{24}$ linear or branched alkanes, $C_8$-$C_{24}$ linear or branched alkenes, $C_8$-$C_{24}$ linear or branched aromatics, or a combination thereof; and $R^2$ is selected from $C_8$-$C_{24}$ linear or branched alkanes, $C_8$-$C_{24}$ linear or branched alkenes, $C_8$-$C_{24}$ linear or branched aromatics, or a combination thereof. In certain embodiments, $R^1$ is selected from $C_{10}$-$C_{15}$ linear or branched alkanes; and $R^2$ is selected from $C_{10}$-$C_{15}$ linear or branched alkanes.

Alkyl ketene dimers may be prepared by reacting long-chain carboxylic acid chlorides in inert solvents (such as diethyl ether) with triethylamine as tertiary amine under anhydrous conditions. After filtration of the insoluble triethylamine hydrochloride and evaporation of the solvent, long-chain alkyl chain dimers are obtained.

In some embodiments, the compatibilizer is selected from olefin-styrene-glycidyl-methacrylate copolymers. An exemplary olefin-styrene-glycidyl-methacrylate copolymer is polypropylene homopolymer grafted with poly(styrene-co-methyl methacrylate-co-glycidyl methacrylate), such as AddiCo® 5933 from AddiCo in Mexico.

In the nanocellulose-containing composite product, the matrix material may be selected from the group consisting of polymers, paper, paperboard, fiber and wood composites, emulsions, hydrogels, carbon, organic solids, inorganic solids, oils, organic liquids, inorganic liquids, cementitious materials, minerals, ceramics, metals, metal alloys, glass, and combinations thereof. Polymers may be selected from the group consisting of polyolefins, polyols, polyesters, polyamides, polylactide, polystyrene, polycarbonates, polyacrylates, polystyrenes, polybutadiene, styrene-butadiene rubbers, natural rubbers, polyurethanes, polyureas, poly(amide-enamine)s, polyanhydrides, polyhydroxyalkanoates, poly(alkene dicarboxylate)s, silicones, carbonaceous polymers, and combinations or co-polymers thereof. In certain embodiments, the polymers are selected from the group consisting of polypropylene, polylactide, polybutadiene, styrene-butadiene rubbers, natural rubbers, and combinations or co-polymers thereof.

In some variations, a technical scheme is provided with the following steps (see also the flowchart of FIG. 12). First, a matrix material is selected based on engineering and product needs, noting that the principles of the invention may be applied to polymers or non-polymers as the matrix material. Second, a nanocellulose material is selected such that the nanocellulose is expected to improve some property of the matrix material (e.g., mechanical strength, viscosity, etc.). Third, a dispersion/drying agent is selected based on the selected nanocellulose material, such that the dispersion/drying agent is compatible with the nanocellulose. Fourth, a nanocellulose-dispersion concentrate is made by combining the dispersion/drying agent and the nanocellulose, and optionally other components. Fifth, a nanocellulose-dispersion masterbatch is made by combining the nanocellulose-dispersion concentrate with a carrier material (e.g., a carrier polymer). Sixth, the nanocellulose-dispersion masterbatch is combined with the selected matrix material to fabricate a composite product (e.g., a polymer-nanocellulose composite). The step of making a nanocellulose-dispersion masterbatch may be omitted in some embodiments, in which case the nanocellulose-dispersion concentrate is combined directly with the selected matrix material to fabricate a composite product.

Some variations provide a process to produce a nanocellulose-dispersion concentrate, the process comprising:

providing a nanocellulose gel comprising nanocellulose and water;

selecting a dispersion/drying agent for compatibility with the nanocellulose, wherein the dispersion/drying agent is selected from the group consisting of waxes, polyolefins, olefin-maleic anhydride copolymers, olefin-acrylic acid copolymers, polyols, fatty acids, fatty alcohols, polyol-glyceride esters, polydimethylsiloxanes, polydimethylsiloxane-alkyl esters, polyacrylamides, starches, cellulose derivatives, particulates, and combinations or reaction products thereof;

mixing the nanocellulose gel and the dispersion/drying agent;

removing at least a portion of the water, during the mixing step or after the mixing step, to generate a nanocellulose-dispersion concentrate;

optionally milling the nanocellulose-dispersion concentrate to generate a powder; and recovering the nanocellulose-dispersion concentrate in solid form or liquid form.

The water in the nanocellulose gel may be replaced by another polar solvent, at least in part. Typically nanocellulose is made in aqueous solution, but that is not strictly necessary. The biomass fractionation procedure to make nanocellulose may in principle use a polar solvent, such as glycerol or ethanol, in place of water or in addition to water. Thus while most of thus disclosure refers to water as the primary or only polar solvent in the starting nanocellulose gel, it will be understood that one or more polar solvents other than water may be utilized.

Some variations provide a process to produce a nanocellulose-dispersion masterbatch, the process comprising:

providing a nanocellulose gel comprising nanocellulose and water;

selecting a dispersion/drying agent for compatibility with the nanocellulose, wherein the dispersion/drying agent is selected from the group consisting of waxes, polyolefins, olefin-maleic anhydride copolymers, olefin-acrylic acid copolymers, polyols, fatty acids, fatty alcohols, polyol-glyceride esters, polydimethylsiloxanes, polydimethylsiloxane-alkyl esters, polyacrylamides, starches, cellulose derivatives, particulates, and combinations or reaction products thereof;

mixing the nanocellulose gel and the dispersion/drying agent;

removing at least a portion of the water (i.e., drying), during the mixing step or after the mixing step, to generate a nanocellulose-dispersion concentrate;

optionally milling the nanocellulose-dispersion concentrate to generate a concentrate powder;

introducing a carrier polymer to the nanocellulose-dispersion concentrate to generate a nanocellulose-dispersion masterbatch, during mixing the nanocellulose gel and the dispersion/drying agent, and/or during removing at least a portion of the water, and/or after removing at least a portion of the water, thereby generating a nanocellulose-dispersion masterbatch, and/or while milling (if performed) the nanocellulose-dispersion concentrate to generate a concentrate powder, and/or after milling (if performed) the nanocellulose-dispersion concentrate to generate a concentrate powder;

optionally milling the nanocellulose-dispersion masterbatch to generate a masterbatch powder; and recovering the nanocellulose-dispersion masterbatch, preferably in solid form.

Some variations provide a process to produce a nanocellulose-polymer composite product, the process comprising:

providing a nanocellulose gel comprising nanocellulose and water;

selecting a dispersion/drying agent for compatibility with the nanocellulose and with the nanocellulose-polymer composite product, wherein the dispersion/drying agent is selected from the group consisting of waxes, polyolefins, olefin-maleic anhydride copolymers, olefin-acrylic acid copolymers, polyols, fatty acids, fatty alcohols, polyol-glyceride esters, polydimethylsiloxanes, polydimethylsiloxane-alkyl esters, polyacrylamides, starches, cellulose derivatives, particulates, and combinations or reaction products thereof;

mixing the nanocellulose gel and the dispersion/drying agent;

removing at least a portion of the water (i.e., drying), during the mixing step or after the mixing step, to generate a nanocellulose-dispersion concentrate;

optionally milling the nanocellulose-dispersion concentrate to generate a concentrate powder;

introducing a carrier polymer to the nanocellulose-dispersion concentrate to generate a nanocellulose-dispersion masterbatch, during mixing the nanocellulose gel and the dispersion/drying agent, and/or during removing at least a portion of the water, and/or after removing at least a portion of the water, thereby generating a nanocellulose-dispersion masterbatch, and/or while milling (if performed) the nanocellulose-dispersion concentrate to generate a concentrate powder, and/or after milling (if performed) the nanocellulose-dispersion concentrate to generate a concentrate powder;

optionally milling the nanocellulose-dispersion masterbatch to generate a masterbatch powder;

mixing the nanocellulose-dispersion masterbatch with a matrix polymer, and mechanically and/or thermally processing the combined material, to generate a nanocellulose-polymer composite product; and recovering the nanocellulose-polymer composite product.

Certain variations provide a process to produce a nanocellulose-polymer composite product without a carrier polymer, the process comprising:

providing a nanocellulose gel comprising nanocellulose and water;

selecting a dispersion/drying agent for compatibility with the nanocellulose and with the nanocellulose-polymer composite product, wherein the dispersion/drying agent is selected from the group consisting of waxes, polyolefins, olefin-maleic anhydride copolymers, olefin-acrylic acid copolymers, polyols, fatty acids, fatty alcohols, polyol-glyceride esters, polydimethylsiloxanes, polydimethylsiloxane-alkyl esters, polyacrylamides, starches, cellulose derivatives, particulates, and combinations or reaction products thereof;

mixing the nanocellulose gel and the dispersion/drying agent;

removing at least a portion of the water (i.e., drying), during the mixing step or after the mixing step, to generate a nanocellulose-dispersion concentrate;

optionally milling the nanocellulose-dispersion concentrate to generate a concentrate powder;

mixing the nanocellulose-dispersion concentrate with a matrix polymer, and mechanically and/or thermally processing the combined material, to generate a nanocellulose-polymer composite product; and recovering the nanocellulose-polymer composite product.

In some variations, a process to produce a nanocellulose-dispersion concentrate comprises:

providing a nanocellulose gel comprising nanocellulose and water;

selecting a dispersion/drying agent for compatibility with the nanocellulose, wherein the dispersion/drying agent is selected from the group consisting of waxes, polyolefins, olefin-maleic anhydride copolymers, olefin-acrylic acid copolymers, polyols, fatty acids, fatty alcohols, polyol-glyceride esters, polydimethylsiloxanes, polydimethylsiloxane-alkyl esters, polyacrylamides, starches, cellulose derivatives, particulates, and combinations or reaction products thereof;

mixing the nanocellulose gel and the dispersion/drying agent;

removing at least a portion of the water, during the mixing step or after the mixing step, to generate a nanocellulose-dispersion concentrate;

optionally milling the nanocellulose-dispersion concentrate to generate a powder; and recovering the nanocellulose-dispersion concentrate in solid form or liquid form.

In some embodiments, the step of removing at least a portion of the water comprises high-shear mixing with heating to a temperature of at least 50° C.

In some embodiments, the process further comprises combining the nanocellulose-dispersion concentrate with a carrier material, to form a nanocellulose-dispersion masterbatch. The carrier material may be a carrier polymer, for example.

In some embodiments, the process further comprises combining the nanocellulose-dispersion masterbatch with a matrix material, to form a nanocellulose-containing composite product.

The matrix material may be a matrix polymer. For example, the matrix polymer may be selected from the group consisting of polyolefins, polyols, polyesters, polyamides, polylactide, polystyrene, polycarbonates, polyacrylates, polystyrenes, styrenic rubbers, natural rubbers, synthetic rubbers, polyurethanes, polyureas, poly(amide-enamine)s, polyanhydrides, polyhydroxyalkanoates, poly(alkene dicarboxylate)s, silicones, carbonaceous polymers, and combinations or co-polymers thereof.

Alternatively, or additionally, the matrix material may be a material other than a polymer, such as a material selected from the group consisting of paper, paperboard, fiber and wood composites (e.g., particleboard and molded pulp products), emulsions, hydrogels, carbon, organic solids, inorganic solids, oils, organic liquids, inorganic liquids, cementitious materials (e.g., concrete or cement), minerals, ceramics, metals, metal alloys, glass, and combinations thereof. A non-polymer matrix material may be an adhesive matrix, a battery electrode matrix, a bioink matrix, or an electronic ink matrix, for example.

In embodiments in which a masterbatch is made, the drying step to produce the concentrate may be carried out at the same location as, or a different location from, the step of making the masterbatch. Also, the drying step to produce the concentrate may be carried out at the same location as, or a different location from, the step of making the final composite (combining the matrix material with the masterbatch or the concentrate).

In some embodiments, the process further comprises combining the nanocellulose-dispersion concentrate directly (not via a masterbatch) with a matrix material, to form a nanocellulose-containing composite product.

When a nanocellulose-dispersion concentrate is directly added to a matrix material, the matrix material may be a matrix polymer, such as a polymer selected from the group consisting of polyolefins, polyols, polyesters, polyamides, polylactide, polystyrene, polycarbonates, polyacrylates, polystyrenes, styrenic rubbers, natural rubbers, synthetic rubbers, polyurethanes, polyureas, poly(amide-enamine)s, polyanhydrides, polyhydroxyalkanoates, poly(alkene dicarboxylate)s, silicones, carbonaceous polymers, and combinations or co-polymers thereof.

Alternatively, or additionally, the matrix material may be selected from the group consisting of paper, paperboard, fiber and wood composites, emulsions, hydrogels, carbon, organic solids, inorganic solids, oils, organic liquids, inorganic liquids, cementitious materials, minerals, ceramics, metals, metal alloys, glass, and combinations thereof.

The drying step (removing at least a portion of the water) to form a concentrate may be carried out at the same location as the step of directly combining the nanocellulose-dispersion concentrate with a matrix material. Alternatively, or additionally, a drying step to form a concentrate may be carried out at a different location as the step of combining the nanocellulose-dispersion concentrate with a matrix material.

In any of the processes disclosed herein, the order of steps may vary in any logical order. Also, the locations of steps may vary, such that the entire process is located at one or multiple sites. For example, a nanocellulose-dispersion masterbatch may be made at a first location and shipped to a second location for polymer compounding to make a polymer composite, which itself is shipped to a third location to make a final commercial product.

All processes disclosed herein may be done in batch, continuously, or semi-continuously. The feed throughout may vary widely, including lab scale, pilot scale, semi-works scale, and commercial scale.

The step of drying nanocellulose gel with dispersion/drying agent is preferably done under mechanical forces, such as shear forces, centrifugal forces, compression forces, or a combination thereof. Typically, shear forces are utilized for the drying step. High-shear mixing techniques under heat include, but are not limited to, homogenization, sigma blade mixing, rotor-stator mixing, static in-line mixing, and extrusion. A melt rheometer may be utilized to achieve high-shear mixing, in certain embodiments. Preferably, the high-shear mixing apparatus is configured to allow continuous or intermittent vapor release while drying, e.g. venting of water vapor. Note that the step of mixing the nanocellulose gel and the dispersion/drying agent may be configured as a pre-mixing step prior to drying. The pre-mixing step does not necessarily need to be high-shear mixing.

Also, the drying step is preferably performed at elevated temperatures and optionally under vacuum, such as at about 50° C., 60° C., 70° C., 80° C., 90° C., 100° C., 110° C., 120° C., 130° C., 140° C., or 150° C. The drying temperature may be based in part on the melting point of the dispersion/drying agent. The elevated temperature may be achieved via heat addition and/or by the heat generated from the mixing forces. The drying step may be performed for a suitable time, such as from about 1 minute to about 4 hours.

The step of removing at least a portion of the water (referred to herein as "drying" regardless of mechanism or apparatus) may be done during mixing, if the mixing is performed at least at the boiling point of water at the mixing pressure, and if water vapor can be released from the mixing apparatus. Water removal may be accomplished solely by evaporation, but not necessarily. For example, the processing time and amount of water required to be removed during drying can be reduced significantly by pre-concentrating via a centrifuge, a filter press, or a belt press. In some embodiments, sufficient water removal is achieved via centrifugation or filtering, without evaporation. Typically, water (or other polar solvent) is allowed to evaporate from the nanocellulose gel. As water is removed while mixing, the dispersion/drying agent prevents the nanocellulose from agglomerating and irreversibly bonding with itself.

The nanocellulose-dispersion concentrate may contain water at a moisture concentration of about, or at most about, 70 wt %, 60 wt %, 50 wt %, 45 wt %, 40 wt %, 35 wt %, 30 wt %, 25 wt %, 20 wt %, 15 wt %, 10 wt %, 9 wt %, 8 wt %, 7 wt %, 6 wt %, 5 wt %, 4 wt %, 3 wt %, 2.5 wt %, 2 wt %, 1.5 wt %, 1 wt %, 0.9 wt %, 0.8 wt %, 0.7 wt %, 0.6 wt %, 0.5 wt %, 0.4 wt %, 0.3 wt %, 0.2 wt %, 0.1 wt %, 0.05 wt %, 0.01 wt %, or 0 wt %, including any intervening ranges (e.g., about 0.5-1.5 wt % water or about 0.1-7 wt % water).

Nanocellulose may be characterized by the unbound and bound moisture. Accordingly, the selection of the drying method and the configuration of the equipment and operating parameters may be adapted to the ratio of unbound to bound moisture in the drying system's feed. This ratio is generally different for lignin-containing nanocellulose, compared to non-lignin-containing nanocellulose, all other factors being the same.

The milling to generate a concentrate powder or masterbatch powder, if performed, may generally be done using conventional apparatus, such as (but not limited to) a hammer mill, a ball mill, a jet mill, an impact crusher, a pulverizer, a cage mill, or a grinder. The milling step, if performed, may be selected based on the drying technique and the nature of the dried material to be milled.

The nanocellulose-dispersion masterbatch may contain water at a moisture concentration of about, or at most about, 10 wt %, 9 wt %, 8 wt %, 7 wt %, 6 wt %, 5 wt %, 4 wt %, 3 wt %, 2.5 wt %, 2 wt %, 1.5 wt %, 1 wt %, 0.9 wt %, 0.8 wt %, 0.7 wt %, 0.6 wt %, 0.5 wt %, 0.4 wt %, 0.3 wt %, 0.2 wt %, 0.1 wt %, 0.05 wt %, 0.01 wt %, or 0 wt %, including any intervening ranges.

Some or all of the dispersion/drying agent (and any solvent) may be removed while compounding or after the composite is made. For example, in the case of glycerol as the dispersion/drying agent or a solvent, glycerol may be removed from extruder vents. As another example, in the case of a wax as the dispersion/drying agent, the wax may be selectively melted out of composite. It is preferred that when the dispersion/drying agent is removed, the matrix polymer and/or the carrier polymer fill the space left behind by the dispersion/drying agent, so that the nanocellulose remains non-agglomerated even after removal of some or all of the dispersion/drying agent.

The present invention accommodates a wide variety of nanocellulose materials. Nanocellulose can be produced by breaking down biomass to sub-micron cellulose nanofibrils or nanocrystals using chemical means, mechanical means, or a combination of chemical and mechanical means. Other methods for providing nanocellulose, such as bacterial nanocellulose and tunicate-derived nanocellulose, are also available.

Typically, the production of nanocellulose occurs in two primary stages. The first stage is a purification of biomass to remove most of the non-cellulose components in the biomass such as lignin, hemicelluloses, extractives, and inorganic contaminants. This stage is typically performed by conventional pulping and bleaching. For production of cellulose nanofibrils, the second stage typically entails mechanical refining of the purified biomass fibers, with or without chemical or enzymatic treatment to lower the amount of mechanical energy required. For cellulose nanocrystals, the second stage typically entails acidic hydrolysis of the purified fibers, followed by high-shear mechanical treatment.

The nanocellulose may be obtained from fractionation of lignocellulosic biomass in the presence of an acid catalyst, a solvent for lignin, and water, to generate cellulose-rich solids, following by mechanical treatment of the cellulose-rich solids to generate the nanocellulose or a precursor thereof. In some embodiments, the solvent for lignin is an aliphatic alcohol (e.g., ethanol) and the acid catalyst is a sulfur-containing compound selected from the group consisting of sulfur dioxide, sulfurous acid, sulfur trioxide, sulfuric acid, elemental sulfur, sulfonic acids, lignosulfonic acids, and combinations thereof.

The nanocellulose may be obtained from an AVAP® lignocellulosic biomass fractionation process. It has been found that very high crystallinity can be produced and maintained during formation of nanofibers or nanocrystals, without the need for an enzymatic or separate acid treatment step to hydrolyze amorphous cellulose. High crystallinity can translate to mechanically strong fibers or good physical reinforcing properties, which are advantageous for composites, reinforced polymers, and high-strength spun fibers and textiles, for example.

In some embodiments, the nanocellulose includes hydrophobic nanocellulose. In these or other embodiments, the nanocellulose includes hydrophilic nanocellulose. In certain embodiments, the nanocellulose includes lignin-containing cellulose nanocrystals (e.g., lignin-coated cellulose nanocrystals) and/or lignin-containing cellulose nanofibrils (e.g., lignin-coated cellulose nanofibrils).

In some embodiments, the nanocellulose material is at least partially hydrophobic via deposition of at least some of the lignin onto a surface of the cellulose-rich solids (nanocellulose precursor). In these or other embodiments, the nanocellulose material is at least partially hydrophobic via deposition of at least some of the lignin onto a surface of the nanocellulose material following mechanical refining.

In some embodiments, the acid is $SO_2$ at a concentration from about 5 wt % to about 30 wt %. In some embodiments, the fractionation temperature is from about 130° C. to about 180° C. In some embodiments, the fractionation time is from about 15 minutes to about 4 hours. The process may be controlled such that a portion of the solubilized lignin intentionally is deposited back onto surfaces of the cellulose-rich solids, thereby rendering the cellulose-rich solids at least partially hydrophobic.

Process conditions may be employed which tend to promote lignin deposition onto fibers, such as extended time and/or temperature, or reduced concentration of solvent for lignin. Alternatively, or additionally, one or more washing steps may be are adapted to deposit at least some of the lignin that was solubilized during the initial fractionation. One approach is to wash with water rather than a solution of water and solvent. Because lignin is generally not soluble in water, it will begin to precipitate. Optionally, other conditions may be varied, such as pH and temperature, during fractionation, washing, or other steps, to optimize the amount of lignin deposited on surfaces. Optionally, a process for producing a hydrophobic nanocellulose material may further include chemically modifying the lignin to increase hydrophobicity of the nanocellulose material.

Alternatively, or additionally, the nanocellulose may be obtained from fractionation of lignocellulosic biomass in the presence of steam or hot water, optionally with a fractionation catalyst (e.g., acetic acid), to obtain cellulose-rich solids, followed by mechanical refining of the cellulose-rich solids to generate nanocellulose. These steps may collectively be referred to as hydrothermal-mechanical treatment. The reaction solution for fractionation may consist essentially of the steam or hot water. Note that "steam or hot water" refers to water that will be in one or more phases dictated by thermodynamics at the given temperature and pressure. The temperature for the fractionation may be from about 120° C. to about 220° C., such as about 150-200° C. The water may be in the form of steam, superheated steam, supersaturated steam, or pressurized liquid water. In some embodiments, the fractionation step is carried out with a residence time from about 1 minute to about 60 minutes, such as about 2, 2.5, 3, 3.5, 4, 5, 7.5, 10, 12.5, 15, 20, 25, 30, 35, 40, 45, 50, or 55 minutes.

In embodiments employing hydrothermal-mechanical treatment, the cellulose-rich solids usually contain a significant concentration of lignin. Therefore, these embodiments can be beneficial when hydrophobic nanocellulose is desired. The hydrothermal-mechanical treatment may generate a nanocellulose that can be referred to as nanolignocellulose due to high lignin content. The nanolignocellulose may contain, on a bone-dry, ash-free, and acetyl-free basis, from about 35 wt % to about 80 wt % cellulose nanofibrils, cellulose microfibrils, or a combination thereof, from about 15 wt % to about 45 wt % lignin, and from about 5 wt % to about 20 wt % hemicelluloses. Of the lignin present, some may coat nanocellulose particles, while the remainder of the lignin is internal to the nanocellulose particles.

Nanocellulose is preferably obtained from lignocellulosic biomass. As used herein, "lignocellulosic biomass" means any material containing cellulose and lignin. Lignocellulosic biomass may also contain hemicellulose. Mixtures of one or more types of biomass can be used. In some embodiments, the biomass feedstock comprises both a lignocellulosic component (such as one described above) in addition to a sucrose-containing component (e.g., sugarcane or energy cane) and/or a starch component (e.g., corn, wheat, rice, etc.). Various moisture levels may be associated with the starting biomass. The biomass feedstock need not be, but may be, relatively dry. In general, the biomass is in the form of a particulate or chip, but starting biomass particle size is not critical.

The biomass feedstock for making nanocellulose may be selected from hardwoods, softwoods, forest residues, *eucalyptus*, industrial wastes, pulp and paper wastes, consumer wastes, or combinations thereof. Some embodiments utilize agricultural residues, which include lignocellulosic biomass associated with food crops, annual grasses, energy crops, or other annually renewable feedstocks. Exemplary agricultural residues include, but are not limited to, corn stover, corn fiber, wheat straw, sugarcane bagasse, sugarcane straw, rice straw, oat straw, barley straw, *miscanthus*, energy cane straw/residue, or combinations thereof.

Other sources of nanocellulose include bacterial nanocellulose, nanocellulose from tunicates, treatment of pulp with sulfuric acid, treatment of pulp with 2,2,6,6-tetramehylpiperidine-1-oxy radical (TEMPO), or treatment of pulp with cellulase enzymes. In some embodiments, the nanocellulose employed herein is not bacterial nanocellulose, is not derived from tunicates, is not obtained from sulfuric acid hydrolysis, is not obtained from TEMPO, and/or is not obtained via enzymatic hydrolysis of lignocellulosic biomass or cellulose.

As intended herein, "nanocellulose" is broadly defined to include a range of cellulosic materials, including but not limited to microfibrillated cellulose, nanofibrillated cellulose, microcrystalline cellulose, nanocrystalline cellulose, and particulated or fibrillated dissolving pulp. In certain embodiments, the nanocellulose includes particles having at least one length dimension (e.g., diameter) on the nanometer scale. In some embodiments, the nanocellulose has particles with all average dimensions greater than 1 micron, such as for certain microfibrillated celluloses.

"Nanofibrillated cellulose" or equivalently "cellulose nanofibrils" means cellulose fibers or regions that contain nanometer-sized particles or fibers, or both micron-sized and nanometer-sized particles or fibers. "Nanocrystalline cellulose" or equivalently "cellulose nanocrystals" means cellulose particles, regions, or crystals that contain nanometer-sized domains, or both micron-sized and nanometer-sized domains. "Micron-sized" includes from 1 μm to 100 μm and "nanometer-sized" includes from 0.01 nm to 1000 nm (1 μm). Larger domains (including long fibers) may also be present in any of these materials.

The particular size and shape of the nanocellulose can range from nanometer scale up to micron scale, in width and/or length. Cellulose nanofibers typically have dimensions of 5-20 nm in width and 500-5000 nm in length and contain both amorphous and crystalline domains of cellulose. Cellulose nanocrystals typically have a width of 3-8 nm and a length of 100-500 nm and are predominantly crystalline. While these ranges and dimensions are typical, this invention encompasses all nanocellulose materials, regardless of particle shapes or particle dimensions.

Some embodiments employ a blend of nanocellulose crystals and fibrils. A blend of nanocellulose crystals and fibrils may contain from 1% to 99% nanocellulose crystals and from 99% to 1% of nanocellulose fibrils, respectively. In various embodiments, the blend of nanocellulose crystals and fibrils contains 2%, 5%, 10%, 15%, 20%, 25%, 30%, 35%, 40%, 45%, 50%, 55%, 60%, 65%, 70%, 75%, 80%, 85%, 90%, 95%, or 98% (all weight percentages) of nanocellulose crystals, with the rest of the nanocellulose being nanocellulose fibrils.

Some embodiments employ a blend of cellulose nanofibrils and microfibrils. A blend of cellulose nanofibrils and cellulose microfibrils may contain from 1% to 99% cellulose nanofibrils and from 99% to 1% of cellulose microfibrils, respectively. In various embodiments, the blend of cellulose nanofibrils and microfibrils contains 2%, 5%, 10%, 15%, 20%, 25%, 30%, 35%, 40%, 45%, 50%, 55%, 60%, 65%, 70%, 75%, 80%, 85%, 90%, 95%, or 98% (all weight percentages) of cellulose nanofibrils, with the rest being cellulose microfibrils.

One characteristic of a nanocellulose blend is the wide range of particles sizes present, since nanocellulose fibrils are much larger than nanocellulose crystals. The nanocellulose crystal width may vary from about 2 nanometers to about 10 nanometers, or from about 3 nanometers to about 6 nanometers, for example. The nanocellulose crystal length may vary from about 50 nanometers to about 500 nanometers, or from about 100 nanometers to about 350 nanometers, for example. The nanocellulose fibril width may vary from about 5 nanometers to about 100 nanometers, or from about 10 nanometers to about 50 nanometers, for example. The nanocellulose fibril length may vary from about 200 nanometers to about 10 microns, or from about 400 nanometers to about 3 microns, for example. The average nanocellulose particle width in the blend may vary from about 3 nanometers to about 50 nanometers, such as from about 5 nanometers to about 30 nanometers. The average nanocellulose particle length in the blend may vary from about 50 nanometers to about 5 microns, such as from about 100 nanometers to about 2 microns.

In some variations, a process for producing nanocellulose comprises:

(a) providing a lignocellulosic biomass feedstock;

(b) fractionating the feedstock in the presence of an acid, a solvent for lignin, and water, to generate cellulose-rich solids and a liquid containing hemicellulose and lignin;

(c) mechanically treating the cellulose-rich solids to form cellulose fibrils and/or cellulose crystals, thereby generating a nanocellulose material having a crystallinity (i.e., cellulose crystallinity) of at least 60%; and (d) recovering the nanocellulose material.

In some embodiments, the acid is selected from the group consisting of sulfur dioxide, sulfurous acid, sulfur trioxide, sulfuric acid, lignosulfonic acid, and combinations thereof. In particular embodiments, the acid is sulfur dioxide.

In some embodiments, during step (c), the cellulose-rich solids are treated with a total mechanical energy of less than about 5000 kilowatt-hours per ton of the cellulose-rich solids, such as less than about 4000, 3000, 2000, or 1000 kilowatt-hours per ton of the cellulose-rich solids. Energy consumption may be measured in any other suitable units. An ammeter measuring current drawn by a motor driving the mechanical treatment device is one way to obtain an estimate of the total mechanical energy.

Mechanically treating in step (c) may employ one or more known techniques such as, but by no means limited to, milling, grinding, beating, sonicating, or any other means to form or release nanofibrils and/or nanocrystals in the cellulose. Essentially, any type of mill or device that physically separates fibers may be utilized. Such mills are well-known in the industry and include, without limitation, Valley beaters, single disk refiners, double disk refiners, conical refiners, including both wide angle and narrow angle, cylindrical refiners, homogenizers, microfluidizers, and other similar milling or grinding apparatus. See, for example, Smook, *Handbook for Pulp & Paper Technologists*, Tappi Press, 1992; and Hubbe et al., "Cellulose Nanocomposites: A Review," *BioResources* 3(3), 929-980 (2008).

The extent of mechanical treatment may be monitored during the process by any of several means. Certain optical instruments can provide continuous data relating to the fiber length distributions and % fines, either of which may be used to define endpoints for the mechanical treatment step. The time, temperature, and pressure may vary during mechanical treatment. For example, in some embodiments, sonication for a time from about 5 minutes to 2 hours, at ambient temperature and pressure, may be utilized.

In some embodiments, a portion of the cellulose-rich solids is converted to nanofibrils while the remainder of the cellulose-rich solids is not fibrillated. In various embodiments, about 10%, 20%, 30%, 40%, 50%, 60%, 70%, 80%, 90%, 95%, 99%, or substantially all of the cellulose-rich solids are fibrillated into nanofibrils.

In some embodiments, a portion of the nanofibrils is converted to nanocrystals while the remainder of the nanofibrils is not converted to nanocrystals. In various embodiments, about 10%, 20%, 30%, 40%, 50%, 60%, 70%, 80%, 90%, 95%, 99%, or substantially all of the nanofibrils are converted to nanocrystals. During drying, it is possible for a small amount of nanocrystals to come back together and form nanofibrils.

Following mechanical treatment, the nanocellulose material may be classified by particle size. A portion of material may be subjected to a separate process, such as enzymatic hydrolysis to produce glucose. Such material may have good crystallinity, for example, but may not have desirable particle size or degree of polymerization.

Step (c) may further comprise treatment of the cellulose-rich solids with one or more enzymes or with one or more acids. When acids are employed, they may be selected from the group consisting of sulfur dioxide, sulfurous acid, lignosulfonic acid, acetic acid, formic acid, and combinations thereof. Acids associated with hemicellulose, such as acetic acid or uronic acids, may be employed, alone or in conjunction with other acids. Also, step (c) may include treatment of the cellulose-rich solids with heat. In some embodiments, step (c) does not employ any enzymes or acids.

In step (c), when an acid is employed, the acid may be a strong acid such as sulfuric acid, nitric acid, or phosphoric acid, for example. Weaker acids may be employed, under more severe temperature and/or time. Enzymes that hydrolyze cellulose (i.e., cellulases) and possibly hemicellulose (i.e., with hemicellulase activity) may be employed in step (c), either instead of acids, or potentially in a sequential configuration before or after acidic hydrolysis.

In some embodiments, the process comprises enzymatically treating the cellulose-rich solids to hydrolyze amorphous cellulose. In other embodiments, or sequentially prior to or after enzymatic treatment, the process may comprise acid-treating the cellulose-rich solids to hydrolyze amorphous cellulose.

In some embodiments, the process further comprises enzymatically treating the nanocrystalline cellulose. In other embodiments, or sequentially prior to or after enzymatic treatment, the process further comprises acid-treating treating the nanocrystalline cellulose.

If desired, an enzymatic treatment may be employed prior to, or possibly simultaneously with, the mechanical treatment. However, in preferred embodiments, no enzyme treatment is necessary to hydrolyze amorphous cellulose or weaken the structure of the fiber walls before isolation of nanofibers.

Following mechanical treatment, the nanocellulose may be recovered. Separation of cellulose nanofibrils and/or nanocrystals may be accomplished using apparatus capable of disintegrating the ultrastructure of the cell wall while preserving the integrity of the nanofibrils. For example, a homogenizer may be employed. In some embodiments, cellulose aggregate fibrils are recovered, having component fibrils in range of 1-100 nm width, wherein the fibrils have not been completely separated from each other.

The process may further comprise bleaching the cellulose-rich solids prior to step (c) and/or as part of step (c). Alternatively, or additionally, the process may further comprise bleaching the nanocellulose material during step (c) and/or following step (c). Any known bleaching technology or sequence may be employed, including enzymatic bleaching.

Optionally, the process further comprises hydrolyzing amorphous cellulose into glucose in step (b) and/or step (c), recovering the glucose, and fermenting the glucose to a fermentation product. Optionally, the process further comprises recovering, fermenting, or further treating hemicellulosic sugars derived from the hemicellulose. Optionally, the process further comprises recovering, combusting, or further treating the lignin.

The nanocellulose material may include, or consist essentially of, nanofibrillated cellulose. The nanocellulose material may include, or consist essentially of, nanocrystalline cellulose. In some embodiments, the nanocellulose material may include, or consist essentially of, nanofibrillated cellulose and nanocrystalline cellulose.

In some embodiments, the crystallinity of the cellulose-rich solids (i.e., the nanocellulose precursor material) is at least 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86% or higher. In these or other embodiments, the crystallinity of the nanocellulose material is at least 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86% or higher. The crystallinity may be measured using any known techniques. For example, X-ray diffraction and solid-state $^{13}C$ nuclear magnetic resonance may be utilized.

In some embodiments, the nanocellulose material is characterized by an average degree of polymerization from about 100 to about 3000, such as about 125, 150, 175, 200, 225, 250, 300, 400, 500, 600, 700, 800, 900, 1000, 1100, 1200, 1300, 1400, 1500, 2000, 2500, or 2600. For example, the nanocellulose material may be characterized by an average degree of polymerization from about 300 to about 700, or from about 150 to about 250. The nanocellulose material, when in the form of nanocrystals, may have a degree of polymerization less than 100, such as about 75, 50, 25, or 10. Portions of the material may have a degree of polymerization that is higher than 3000, 4000, or 5000.

In some embodiments, the nanocellulose material is characterized by a degree of polymerization distribution having a single peak. In other embodiments, the nanocellulose material is characterized by a degree of polymerization distribution having two peaks, such as one centered in the range of 150-250 and another peak centered in the range of 300-700.

In some embodiments, the nanocellulose material is characterized by an average length-to-width aspect ratio of particles from about 10 to about 1000, such as about 15, 20, 25, 35, 50, 75, 100, 150, 200, 250, 300, 400, or 500. Nanofibrils are generally associated with higher aspect ratios than nanocrystals. Nanocrystals, for example, may have a length range of about 100 nm to 500 nm and a diameter of about 4 nm, translating to an aspect ratio of 25 to 125. Nanofibrils may have a length of about 2000 nm and diameter range of 5 to 50 nm, translating to an aspect ratio of 40 to 400. In some embodiments, the aspect ratio is less than 50, less than 45, less than 40, less than 35, less than 30, less than 25, less than 20, less than 15, or less than 10.

In some embodiments, the nanocellulose contains less than 0.05 wt % sulfur, such as about 0.02 wt % sulfur or less, including no detectible sulfur. In some embodiments, the nanocellulose contains no sulfate half-ester groups attached to the surface of the nanocellulose particles, as these groups may reduce the thermal stability of the nanocellulose.

Optionally, the nanocellulose itself is functionalized with one or more surface functional groups, to generate nanocellulose derivatives. Such functionalization may be done to improve compatibility with the matrix polymer, for example, or to impart special properties to the nanocellulose. Because nanocellulose has high surface area and high concentration of surface hydroxyl groups, targeted surface modification may introduce virtually any desired surface functionality.

For example, nanocellulose derivatives may be selected from the group consisting of nanocellulose esters, nanocellulose ethers, nanocellulose ether esters, alkylated nanocellulose compounds, cross-linked nanocellulose compounds, acid-functionalized nanocellulose compounds, base-functionalized nanocellulose compounds, and combinations thereof. Various types of nanocellulose functionalization or derivatization may be employed, such as functionalization using polymers, chemical surface modification, functionalization using nanoparticles (i.e. other nanoparticles besides the nanocellulose), modification with inorganics or surfactants, or biochemical modification.

In some embodiments, the nanocellulose is combined with a polymer or a combination of polymers while forming a melt phase, such as in polymer extrusion, injection molding, compression molding, calendering, etc. For example, the nanocellulose may be introduced to the melt phase as part of a nanocellulose-dispersion concentrate and/or as part of a nanocellulose-dispersion masterbatch.

One or more additives may be introduced during the process, wherein the additives may be selected from the group consisting of compatibilizers, plasticizers, antioxidants, colorants, flame retardants, nucleating agents, viscosity modifiers, density modifiers, and combinations thereof. Exemplary additives include, but are by no means limited to, clay, nano-clay, talc, wollastonite, calcium carbonate, silica, mica, kaolin, nickel, glass fibers, carbon, cellulose fibers, aramid fibers, polyimide fibers, jute fibers, polyethylene fibers, polyethylene terephthalate fibers, polyamide fibers, and combinations thereof. In some embodiments, carbonaceous additives are used, such as carbon fibers, carbon nanotubes, graphene, lignin-derived carbon, or lignin.

The matrix polymer may be selected broadly, as noted earlier. The polymer or combination of polymers may include polyesters, polyolefins, polyamides, polystyrenes, styrenic rubbers, polyurethanes, polyureas, poly(amide-enamine)s, polyanhydrides, polyacrylates, polyhydroxyalkanoates, poly(alkene dicarboxylate)s, silicones, thermoplastics elastomers, thermoplastic polyurethanes (TPU), synthetic rubber, natural rubber, or combinations or copolymers thereof.

In some embodiments, the polymer or a combination of polymers includes polylactide. In some embodiments, the polymer or a combination of polymers includes polyhydroxyalkanoates. In some embodiments, the polymer or a combination of polymers includes aliphatic-aromatic copolyesters. In various embodiments, the polymer or a combination of polymers includes polylactide, aliphatic-aromatic copolyesters, poly(butylene adipate co-terephthalate), poly (butylene adipate), or poly(butylene succinate). In some embodiments, the polymer or a combination of polymers includes polyethylene and/or polypropylene.

In some embodiments, the polymer or a combination of polymers includes polyesters, polyolefins, polyamides, polystyrenes, styrenic rubbers, natural rubbers, synthetic rubbers, polyurethanes, polyureas, poly(amide-enamine)s, polyanhydrides, polyacrylates, polyhydroxyalkanoates, poly (alkene dicarboxylate)s, silicones, thermoplastics elastomers, thermoplastic polyurethane (TPU), synthetic rubber, natural rubber, or combinations or copolymers thereof. Some polymer blends include polylactide, polyhydroxyalkanoates, aliphatic-aromatic copolyesters, both polylactide and aliphatic-aromatic copolyesters, polyethylene and/or polypropylene.

Polymers that may be included in the composite product may be hydrophobic, partially hydrophobic, or oleophilic, for example. Hydrophilic polymers may be modified to render them at least partially hydrophobic, with suitable coatings or combinations of components (e.g., interpenetrating networks of polymers).

In some embodiments, polymers are selected from polyesters, polyolefins, polyamides, polystyrenes, styrenic rubbers, polyurethanes, polyureas, poly(amide-enamine)s, polyanhydrides, polyacrylates, polyhydroxyalkanoates, poly (alkene dicarboxylate)s, silicones, and combinations or copolymers (e.g., aliphatic-aromatic copolyesters) thereof.

In various embodiments, a polymer is selected from the group consisting of polyethylene, polypropylene, polybutene, polyisobutylene, polybutadiene, polyisoprene, poly (ethylene-co-acrylic acid), poly(lactic acid) (or polylactide), poly(glycolic acid) (or polyglycolide), poly(hydroxybutyrate), poly(butylene adipate-co-terephtalate), poly(butylene succinate), poly(hydroxybutyrate-co-hydroxyvalerate), poly(ethylene terephthalate), polyvinyl alcohol, polystyrene, poly(butyl acrylate), poly(tert-butyl acrylate-co-ethyl acrylate-co-methacrylic acid), poly(ethyl acrylate), poly(2-ethylhexyl acrylate), poly(methyl acrylate), polyacrylonitrile, poly(acrylonitrile-co-methyl acrylate), poly(styrene-co-maleic anhydride), poly(methyl methacrylate), poly(alkyl methacrylate), polyvinylcyclohexane, poly(Bisphenol A carbonate), poly(propylene carbonate), poly(1,4-butylene adipate), poly(1,4-butylene succinate), poly(1,4-butylene terephthalate), poly(ethylene succinate), poly(vinyl acetate), poly(propylene glycol), poly(tetrahydrofuran), poly(ethyl vinyl ether), polydimethylsiloxane, nylons (aliphatic polyamides), and combinations or copolymers thereof. Carbonaceous polymers may also be incorporated in the composites. Examples of carbonaceous polymers include polyacenaphthylene, graphite, graphene, carbon fibers, and lignin.

Polymers or copolymers may be produced by polymerizing one or more monomers selected from the group consisting of acrylics, amides, carbon, carbonates, dienes, esters, ethers, fluorocarbons, imides, olefins, organic acids (e.g., lactic acid, glycolic acid, succinic acid, hydroxypropionic acid, etc.), styrenes, siloxanes, vinyl acetals, vinyl and vinylidene chlorides, vinyl esters, vinyl ethers, vinyl ketones, vinylpyridine, vinypyrrolidone, and combinations thereof.

The polymer in the polymer composite may comprise a thermoplastic polymer, a thermoset polymer, or a combination of these. Thermoset polymers include, but are not limited to, polyurethanes, polyesters, polyureas, polyisoprenes (including natural rubber or synthetic rubber), phenol-formaldehyde resins, polyepoxides, polyimides, polycyanurates, polyfurans, silicones, and combinations or co-polymers thereof.

In some embodiments, the polymer is specifically an elastomer. Exemplary elastomers include natural rubber (e.g., natural latex non-vulcanized rubber) and synthetic rubber. Natural rubber is mainly poly-cis-isoprene. Synthetic rubber is made from various petroleum-based monomers. The most prevalent synthetic rubbers are styrene-butadiene rubbers (SBR) derived from the copolymerization of styrene and 1,3-butadiene. Other synthetic rubbers are prepared from isoprene (2-methyl-1,3-butadiene, yielding polyisoprene), chloroprene (2-chloro-1,3-butadiene), and isobutylene (methylpropene) with a small percentage of isoprene for crosslinking (making butyl rubber).

In some embodiments, the matrix polymer is bio-based, biodegradable, and/or compostable. In these or other embodiments, the carrier polymer is bio-based, biodegradable, and/or compostable. In some embodiments, the matrix polymer or carrier polymer is or includes a biodegradable polymer, such as any polymer described in Vroman and Tighzert, "Biodegradable Polymers," Materials 2009, 2, 307-344, which is hereby incorporated by reference herein. In some embodiments of the invention, a nanocellulose-polymer composite product has at least 50%, 60%, 70%, 80%, 90%, 95%, or 100% renewable carbon content, as measurable by $^{13}C$ analysis, for example.

Some methods further include forming a hardened or finished polymer composite from the melt phase, using well-known polymer processing techniques. Various industrial and consumer products may be fabricated from the nanocellulose-polymer composite product. These include any known products containing polymers, as well as new products (such as engineered composites). Many types of products are possible, including films, coatings, packaging, utensils, fibers, fabrics, apparel, durable goods, nonwovens, and so on.

The final composite product may be in the form of a pellet, extruded part, injection-molded part, blow-molded part, spun fiber, layered sheet, film, foam, container, bag, engineered part, 3D-printing substrate, 3D-printed part, or a combination thereof, for example.

The nanocellulose-polymer composite product may be 3D-printed. Three-dimensional (3D) printing, or additive manufacturing, is a process by which an object is created in its three-dimensional form using a specialized printer. The printer receives instructions from a design file that is created in a computer with the help of a 3D modeling program. The file or the digital blueprint of the object to be printed, is then sliced into two-dimensional (2D) representations that are sent to the printer. The layers of material are built according to the information contained in the file; the layers keep on adding until the full object is printed. The process of 3D printing requires much more time and involves significant capital investments as compared to 2D printing, but offers a wide array of advantages—such as the ability, in principle, to print any geometry. In some embodiments of 3D printing, a masterbatch and matrix polymer are added to a 3D printer. In some embodiments, a nanocellulose-dispersion concentrate and a matrix polymer are added directly to a 3D printer. In some embodiments, a nanocellulose-polymer composite is made and then introduced to a 3D printer for making a selected geometric object. Note that 3D printing may also be used to fabricate a unique masterbatch pellet geometry, by feeding a carrier polymer and nanocellulose-dispersion concentrate to the 3D printer. This may be desirable for marketing purposes.

In some composite products provided herein, the product with dispersed nanocellulose has higher tensile modulus compared to the polymer alone, or compared to an otherwise-identical composite without the dispersion/drying agent.

In some composite products provided herein, the product with dispersed nanocellulose has higher tensile modulus compared to the polymer alone, or compared to an otherwise-identical composite without the dispersion/drying agent.

In some composite products provided herein, the product with dispersed nanocellulose has higher compressive modulus compared to the polymer alone, or compared to an otherwise-identical composite without the dispersion/drying agent.

In some composite products provided herein, the product with dispersed nanocellulose has higher toughness compared to the polymer alone, or compared to an otherwise-identical composite without the dispersion/drying agent.

In some composite products provided herein, the product with dispersed nanocellulose has better moisture barrier and/or oxygen barrier properties compared to the polymer alone, or compared to an otherwise-identical composite without the dispersion/drying agent.

The tensile modulus, compressive modulus toughness, and other properties of the composite product is improved due to the inherent properties of the nanocellulose particles and because those nanocellulose particles are well-dispersed in the composite, as a result of the dispersion/drying agent.

The degree of dispersion of nanocellulose in the final composite, or in the nanocellulose-dispersion concentrate or masterbatch, may be measured or qualitatively assessed. The degree of dispersion is inverse to the degree of agglomeration. If there is perfect, uniform dispersion, then there is no particle agglomeration. This invention does not require perfect dispersion such that every single nanoparticle is isolated from every other nanoparticle.

Figure 11:
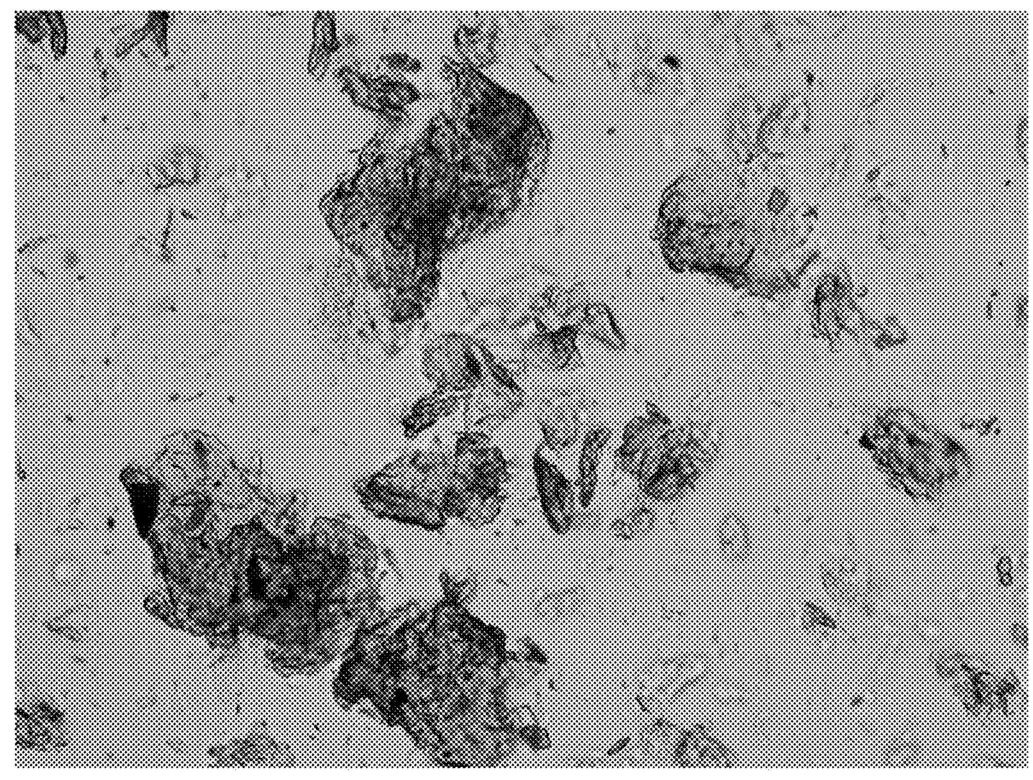
FIG. 11 is an exemplary optical micrograph (100× magnification) showing poor nanocellulose dispersion (significant particle agglomeration) of 2 wt % nanocelluose (lignin-coated nanofibrils) in diisononyl phthalate in which the nanocellulose had been dried without a dispersion/drying agent.

Nanocellulose dispersion may be measured or qualitatively assessed using techniques such as scanning electron microscopy, transmission electron microscopy, interferometric microscopy, confocal laser scanning microscopy, optical microscopy, small-angle X-ray scattering, atomic force microscopy, dynamic light scattering, nanotomography, or thermogravimetric analysis, for example. FIGS. 1 to 8 (see Examples 1 to 8, respectively) are optical micrographs revealing good dispersion (no agglomeration), in contrast to FIG. 11 which is an optical micrograph showing poor dispersion (significant particle agglomeration).

Nanocellulose dispersion may also be measured or qualitatively assessed using calibration techniques in which validated polymers with known nanocellulose dispersions are tested for a relevant property. Test samples are then measured for the same property which is correlated with the degree of nanocellulose dispersion using a pre-determined graph, equation, or look-up table.

In the final composite product, the dispersion/drying agent may be in the same phase as the nanocellulose, the same phase as the matrix material, and/or in a distinct phase (or no longer present, as explained above). The dispersion/drying agent may be disposed between nanocellulose particles and matrix material. In some embodiments, the dispersion/drying agent surrounds nanocellulose particles. The carrier material may be in the same phase as the nanocellulose, the same phase as the matrix material, and/or in a distinct phase (or not present).

In some embodiments, the process comprises forming a structural object that includes the nanocellulose-containing composite product, or a derivative thereof.

In some embodiments, the process comprises forming a foam or aerogel that includes the nanocellulose-containing composite product, or a derivative thereof.

In some embodiments, the process comprises combining the nanocellulose-containing composite product, or a derivative thereof, with one or more other carbon materials to form a composite containing nanocellulose, carbon, and the matrix material.

In some embodiments, the process comprises forming a film comprising the nanocellulose-containing composite product, or a derivative thereof. The film is optically transparent and flexible, in certain embodiments.

In some embodiments, the process comprises forming a coating or coating precursor comprising the nanocellulose-containing composite product, or a derivative thereof.

In some embodiments, the nanocellulose-containing composite product is configured as a catalyst, catalyst substrate, or co-catalyst. In some embodiments, the nanocellulose-containing composite product is configured electrochemically for carrying or storing an electrical current or voltage.

In some embodiments, the nanocellulose-containing composite product is incorporated into a filter, membrane, or other separation device.

In some embodiments, the nanocellulose-containing composite product is incorporated as an additive into a coating, paint, or adhesive. In some embodiments, the nanocellulose-containing composite product is a cement additive.

A nanocellulose-containing composite product may include any of the disclosed compositions. Many composite products are possible. For example, a composite product may be selected from the group consisting of a structural object, a foam, an aerogel, a carbon composite, a film, a coating, a coating precursor, a current or voltage carrier, a filter, a membrane, a catalyst, a catalyst substrate, a coating or coating additive, a paint or paint additive, an adhesive or adhesive additive, an ink or ink additive, a cement additive, a paper coating or paper additive, a thickening agent, a rheological modifier, an additive for a drilling fluid, and combinations or derivatives thereof.

Nanocellulose-containing composite products provided herein are suitable as coating materials as they are expected to have a high oxygen barrier and affinity to wood fibers for application in food packaging and printing papers. Alternatively, or additionally, the nanocellulose-containing composite products may be incorporated into products to improve barrier properties or to improve nucleation, for example.

Nanocellulose-containing composite products provided herein are suitable as additives to improve the durability of paint, protecting paints and varnishes from attrition caused by UV radiation.

Nanocellulose-containing composite products provided herein are suitable as thickening agents in food and cosmetics products. Nanocellulose can be used as thixotropic, biodegradable, dimensionally stable thickener (stable against temperature and salt addition). Nanocellulose-polymer composite products provided herein are suitable as a Pickering stabilizer for emulsions and particle stabilized foam. The large surface area of nanocellulose in combination with its biodegradability makes it attractive materials for highly porous, mechanically stable aerogels.

In other embodiments, a nanocellulose-dispersion masterbatch is used as, or incorporated into, a structural object, a foam, an aerogel, a carbon composite, a film, a coating, a coating precursor, a current or voltage carrier, a filter, a membrane, a catalyst, a catalyst substrate, a coating additive, a paint additive, an adhesive additive, a cement additive, a paper coating, a thickening agent, a rheological modifier, an additive for a drilling fluid, and combinations or derivatives thereof.

In other embodiments, a nanocellulose-dispersion concentrate is incorporated into a structural object, a foam, an aerogel, a carbon composite, a film, a coating, a coating precursor, a current or voltage carrier, a filter, a membrane, a catalyst, a catalyst substrate, a coating additive, a paint additive, an adhesive additive, a cement additive, a paper coating, a thickening agent, a rheological modifier, an additive for a drilling fluid, and combinations or derivatives thereof. Other applications suitable to the present invention include high-strength spun fibers and textiles, advanced composite materials, barrier films, paints, lacquers, adhesives, switchable optical devices, pharmaceuticals, drug delivery systems, bone replacement, tooth repair, paper, packaging, building products, additives for foods and cosmetics, and hydrogels.

Aerospace and transportation composites may benefit from the disclosed nanocellulose-dispersion concentrates or masterbatches. Automotive applications include nanocellulose composites with polypropylene, polyamide (e.g. Nylons), or polyesters (e.g. PBT).

The nanocellulose-dispersion concentrates or masterbatches provided herein are suitable as strength-enhancing additives for renewable and biodegradable composites. The dispersion/drying agent may function as a binder between two organic phases for improved fracture toughness and prevention of crack formation for application in packaging, construction materials, appliances, and renewable fibers.

The nanocellulose-dispersion concentrates or masterbatches provided herein are suitable as transparent and dimensional stable strength-enhancing additives for application in flexible displays, flexible circuits, printable electronics, and flexible solar panels.

The nanocellulose-dispersion concentrates or masterbatches provided herein are suitable for composite and cement additives allowing for crack reduction and increased toughness and strength. Foamed, cellular nanocellulose-concrete hybrid materials allow for lightweight structures with increased crack reduction and strength.

Strength enhancement with nanocellulose increases both the binding area and binding strength for application in high-strength, high-bulk, high-filler content paper and board with enhanced moisture and oxygen barrier properties. The pulp and paper industry in particular may benefit from the nanocellulose-dispersion concentrates or masterbatches provided herein.

In some embodiments, the nanocellulose-dispersion concentrate is incorporated as a thickening agent or rheological modifier. For example, the nanocellulose-dispersion concentrate may be an additive in a drilling or fracturing fluid, such as (but not limited to) an oil recovery fluid and/or a gas recovery fluid.

The nanocellulose-dispersion concentrate may generally be useful in any system that can benefit from incorporation of the nanocellulose-dispersion concentrate. As discussed in this specification, systems include, but are by no means limited to, polymers, oligomers, paper, paperboard, fiber and wood composites, emulsions, hydrogels, carbon, organic solids, inorganic solids, oils, organic liquids, inorganic liquids, cementitious materials (e.g., concrete or cement), minerals, ceramics, metals, metal alloys, glass, or a combination thereof. A non-polymer matrix material may be an adhesive matrix, a battery electrode matrix, a bioink matrix, or an electronic ink matrix, for example.

In this detailed description, reference has been made to multiple embodiments of the invention and non-limiting examples relating to how the invention can be understood and practiced. Other embodiments that do not provide all of the features and advantages set forth herein may be utilized, without departing from the spirit and scope of the present invention. This invention incorporates routine experimentation and optimization of the methods and systems described herein. Such modifications and variations are considered to be within the scope of the invention defined by the claims.

All publications, patents, and patent applications cited in this specification are herein incorporated by reference in their entirety as if each publication, patent, or patent application were specifically and individually put forth herein.

Where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially.

Therefore, to the extent there are variations of the invention, which are within the spirit of the disclosure or equivalent to the inventions found in the appended claims, it is the intent that this patent will cover those variations as well. The present invention shall only be limited by what is claimed.

EXAMPLES

Example 1: Preparation of Nanocellulose-Dispersion Concentrate and Nanocellulose-Polypropylene Composite Lignin-coated nanofibrils are obtained from fractionation of lignocellulosic biomass (softwood chips) in the presence of an acid catalyst (sulfur dioxide), a solvent for lignin (ethanol), and water, to generate cellulose-rich solids, following by mechanical treatment of the cellulose-rich solids to generate the lignin-coated nanofibrils. The lignin-coated nanofibrils are present in an aqueous suspension with about 3 wt % solids. The aqueous suspension may be referred to as a nanocellulose gel.

A dispersion/drying agent is selected to be a copolymer of ethylene and maleic anhydride, based on the lignin-coated nanofibrils and the selected matrix polymer (polypropylene). The specific dispersion/drying agent is Honeywell A-C® 573A wax (Honeywell Performance Materials and Technologies, Morris Plains, N.J., USA), which is an ethylene maleic anhydride copolymer in powder form. Honeywell A-C® 573A wax is a low-molecular-weight copolymer of maleic anhydride and propylene or ethylene. Functionalization of a non-polar propylene or ethylene with maleic anhydride provides the copolymers with both non-polar and polar characteristics. Maleic anhydride provides polarity without polymer degradation, according to Honeywell.

A starting nanocellulose-dispersion concentrate is generated by combining under mechanical stirring 2,917 grams of the aqueous suspension of lignin-coated nanofibrils with 88 grams of the dispersion/drying agent described above, to generate a starting slurry. The starting nanocellulose-dispersion slurry initially contains about 3 wt % nanocellulose (lignin-coated nanofibrils) and about 94 wt % water. The starting slurry is dried with a semi-batch process under heat and shear, using a Brabender PL200 Plasti-Corder torque rheometer with Haake Rheomix 3000 mixer, mixing at mixing blades speed of 100 revolutions per minute (RPM) and a temperature of 120° C. The slurry is added to the rheometer continuously as the volume in the mixer bowl decreases as water is evaporated. The process continues until all the slurry has been fed and until all the moisture has evaporated from the material, for approximately 90 minutes, at which point the dry concentrate is removed from the mixer. The processing time and amount of water required to be removed during drying can be reduced significantly by pre-concentrating the slurry through centrifugation, for example. During mixing under heat, water is allowed to evaporate from the nanocellulose gel. As water is removed under shear mixing, the nanocellulose is prevented from agglomerating and bonding with itself and the wax phase acts as a spacer between the nanocellulose particles.

Once essentially all the water is removed from the starting nanocellulose-dispersion slurry, the result is a nanocellulose-dispersion concentrate containing about 50 wt % nanocellulose (lignin-coated nanofibrils) and about 50 wt % dispersion/drying agent. While it is preferred to remove all water, it is possible for some residual moisture to remain in the nanocellulose-dispersion concentrate. It will also be appreciated that other nanocellulose concentrations may be employed for the nanocellulose-dispersion concentrate.

The nanocellulose-dispersion concentrate obtained above is then ground to a powder in a Bel-Art micro-mill. The resulting powder is then dispersed into polypropylene, as follows. Four parts by weight nanocellulose-dispersion concentrate (which means two parts nanocellulose and two parts dispersion/drying agent) and 96 parts by weight polypropylene random copolymer (ExxonMobil, Houston, Texas, USA) are combined and mixed in the Brabender torque rheometer. The rheometer is operated at a speed of 40 RPM and a temperature of 150° C., for 11 minutes. The resulting nanocellulose-polymer composite is shown in the optical micrograph (100× magnification) of FIG. 1, indicating evenly dispersed 2 wt % nanocellulose (lignin-coated nanofibrils) in polypropylene.

Example 2: Preparation of Nanocellulose-Dispersion Concentrate and Nanocellulose-Polypropylene Composite Lignin-coated nanofibrils are obtained from fractionation of lignocellulosic biomass (softwood chips) in the presence of an acid catalyst (sulfur dioxide), a solvent for lignin (ethanol), and water, to generate cellulose-rich solids, following by mechanical treatment of the cellulose-rich solids to generate the lignin-coated nanofibrils. The lignin-coated nanofibrils are present in an aqueous suspension (gel) with about 3 wt % solids.

A dispersion/drying agent is selected to be a copolymer of ethylene and acrylic acid, based on the lignin-coated nanofibrils and the selected matrix polymer (polypropylene). The specific dispersion/drying agent is Honeywell AClyn® 295A wax (Honeywell Performance Materials and Technologies, Morris Plains, New Jersey, USA), which is a zinc ionomer of an ethylene acrylic acid copolymer that is 98% neutralized with zinc (corrosion protection), in powdered form.

A starting nanocellulose-dispersion slurry is generated by combining under mechanical stirring 2,917 grams of the aqueous suspension of lignin-coated nanofibrils with 88 grams of the dispersion/drying agent described above. The starting nanocellulose-dispersion slurry initially contains about 3 wt % nanocellulose (lignin-coated nanofibrils) and about 94 wt % water. The starting slurry is dried with a semi-batch process under heat and shear, using a Brabender PL200 Plasti-Corder torque rheometer with Haake Rheomix 3000 mixer, mixing at mixing blades speed of 100 revolutions per minute (RPM) and a temperature of 120° C. The slurry is added to the rheometer continuously as the volume in the mixer bowl decreases as water is evaporated. The process continues until all the slurry has been fed and until all the moisture has evaporated from the material, for approximately 90 minutes, at which point the dry concentrate is removed from the mixer. The processing time and amount of water required to be removed during drying can be reduced significantly by pre-concentrating the slurry through centrifugation, for example. During mixing under heat, water is allowed to evaporate from the nanocellulose gel. As water is removed under shear mixing, the nanocellulose is prevented from agglomerating and bonding with itself and the wax phase acts as a spacer between the nanocellulose particles.

Once essentially all the water is removed from the starting nanocellulose-dispersion slurry, the result is a nanocellulose-dispersion concentrate containing about 50 wt % nanocellulose (lignin-coated nanofibrils) and about 50 wt % dispersion/drying agent. While it is preferred to remove all water, it is possible for some residual moisture to remain in the nanocellulose-dispersion concentrate. It will also be appreciated that other nanocellulose concentrations may be employed for the nanocellulose-dispersion concentrate.

The nanocellulose-dispersion concentrate obtained above is then ground to a powder in a Bel-Art micro-mill. The resulting powder is then dispersed into polypropylene, as follows. Four parts by weight nanocellulose-dispersion concentrate and 96 parts by weight polypropylene random copolymer (ExxonMobil, Houston, Texas, USA) are combined and mixed in the Brabender torque rheometer. The rheometer is operated at a speed of 40 RPM and a temperature of 150° C., for 11 minutes. The resulting nanocellulose-polymer composite is shown in the optical micrograph (100× magnification) of FIG. 2, indicating evenly dispersed 2 wt % nanocellulose (lignin-coated nanofibrils) in polypropylene.

Example 3: Preparation of Nanocellulose-Dispersion Concentrate and Nanocellulose-Polypropylene Composite Lignin-coated nanofibrils are obtained from fractionation of lignocellulosic biomass (softwood chips) in the presence of an acid catalyst (sulfur dioxide), a solvent for lignin (ethanol), and water, to generate cellulose-rich solids, following by mechanical treatment of the cellulose-rich solids to generate the lignin-coated nanofibrils. The lignin-coated nanofibrils are present in an aqueous suspension (gel) with about 3 wt % solids.

A dispersion/drying agent is selected to be a copolymer of ethylene and acrylic acid, based on the lignin-coated nanofibrils and the selected matrix polymer (polypropylene). The specific dispersion/drying agent is Honeywell AClyn® 201A wax (Honeywell Performance Materials and Technologies, Morris Plains, New Jersey, USA), which is a calcium ionomer of an ethylene acrylic acid copolymer that is 47% neutralized with calcium, in powdered form.

A starting nanocellulose-dispersion slurry is generated by combining under mechanical stirring 2,917 grams of the aqueous suspension of lignin-coated nanofibrils with 88 grams of the dispersion/drying agent described above. The starting nanocellulose-dispersion slurry initially contains about 3 wt % nanocellulose (lignin-coated nanofibrils) and about 94 wt % water. The starting slurry is dried with a semi-batch process under heat and shear, using a Brabender PL200 Plasti-Corder torque rheometer with Haake Rheomix 3000 mixer, mixing at mixing blades speed of 100 revolutions per minute (RPM) and a temperature of 120° C. The slurry is added to the rheometer continuously as the volume in the mixer bowl decreases as water is evaporated. The process continues until all the slurry has been fed and until all the moisture has evaporated from the material, for approximately 90 minutes, at which point the dry concentrate is removed from the mixer. The processing time and amount of water required to be removed during drying can be reduced significantly by pre-concentrating the slurry through centrifugation, for example. During mixing under heat, water is allowed to evaporate from the nanocellulose gel. As water is removed under shear mixing, the nanocellulose is prevented from agglomerating and bonding with itself and the wax phase acts as a spacer between the nanocellulose particles.

Once essentially all the water is removed from the starting nanocellulose-dispersion concentrate, the result is a nanocellulose-dispersion concentrate containing about 50 wt % nanocellulose (lignin-coated nanofibrils) and about 50 wt % dispersion/drying agent. While it is preferred to remove all water, it is possible for some residual moisture to remain in the nanocellulose-dispersion concentrate. It will also be appreciated that other nanocellulose concentrations may be employed for the nanocellulose-dispersion concentrate.

The nanocellulose-dispersion concentrate obtained above is then ground to a powder in a Bel-Art micro-mill. The resulting powder is then dispersed into polypropylene, as follows. Four parts by weight nanocellulose-dispersion concentrate and 96 parts by weight polypropylene random copolymer (ExxonMobil, Houston, Texas, USA) are combined and mixed in the Brabender torque rheometer. The rheometer is operated at a speed of 40 RPM and a temperature of 150° C., for 11 minutes. The resulting nanocellulose-polymer composite is shown in the optical micrograph (100× magnification) of FIG. 3, indicating evenly dispersed 2 wt % nanocellulose (lignin-coated nanofibrils) in polypropylene.

Example 4: Preparation of Nanocellulose-Dispersion Concentrate and Nanocellulose-Polypropylene Composite Lignin-coated nanofibrils are obtained from fractionation of lignocellulosic biomass (softwood chips) in the presence of an acid catalyst (sulfur dioxide), a solvent for lignin (ethanol), and water, to generate cellulose-rich solids, following by mechanical treatment of the cellulose-rich solids to generate the lignin-coated nanofibrils. The lignin-coated nanofibrils are present in an aqueous suspension (gel) with about 3 wt % solids.

A dispersion/drying agent is selected to be a copolymer of ethylene and acrylic acid, based on the lignin-coated nanofibrils and the selected matrix polymer (polypropylene). The specific dispersion/drying agent is Honeywell A-C® 540A wax (Honeywell Performance Materials and Technologies, Morris Plains, New Jersey, USA), which is an ethylene acrylic acid copolymer, in powdered form. Honeywell A-C® 540A wax contains 5 wt % acrylic acid.

A starting nanocellulose-dispersion slurry is generated by combining under mechanical stirring 2,917 grams of the aqueous suspension of lignin-coated nanofibrils with 88 grams of the dispersion/drying agent described above. The starting nanocellulose-dispersion slurry initially contains about 3 wt % nanocellulose (lignin-coated nanofibrils) and about 94 wt % water. The starting slurry is dried with a semi-batch process under heat and shear, using a Brabender PL200 Plasti-Corder torque rheometer with Haake Rheomix 3000 mixer, mixing at mixing blades speed of 100 revolutions per minute (RPM) and a temperature of 120° C. The slurry is added to the rheometer continuously as the volume in the mixer bowl decreases as water is evaporated. The process continues until all the slurry has been fed and until all the moisture has evaporated from the material, for approximately 90 minutes, at which point the dry concentrate is removed from the mixer. The processing time and amount of water required to be removed during drying can be reduced significantly by pre-concentrating the slurry through centrifugation, for example. During mixing under heat, water is allowed to evaporate from the nanocellulose gel. As water is removed under shear mixing, the nanocellulose is prevented from agglomerating and bonding with itself and the wax phase acts as a spacer between the nanocellulose particles.

Once essentially all the water is removed from the starting nanocellulose-dispersion concentrate, the result is a nanocellulose-dispersion concentrate containing about 50 wt % nanocellulose (lignin-coated nanofibrils) and about 50 wt % dispersion/drying agent. While it is preferred to remove all water, it is possible for some residual moisture to remain in the nanocellulose-dispersion concentrate. It will also be appreciated that other nanocellulose concentrations may be employed for the nanocellulose-dispersion concentrate.

The nanocellulose-dispersion concentrate obtained above is then ground to a powder in a Bel-Art micro-mill. The resulting powder is then dispersed into polypropylene, as follows. Four parts by weight nanocellulose-dispersion concentrate and 96 parts by weight polypropylene random copolymer (ExxonMobil, Houston, Texas, USA) are combined and mixed in the Brabender torque rheometer. The rheometer is operated at a speed of 40 RPM and a temperature of 150° C., for 11 minutes. The resulting nanocellulose-polymer composite is shown in the optical micrograph (100× magnification) of FIG. 4, indicating evenly dispersed 2 wt % nanocellulose (lignin-coated nanofibrils) in polypropylene.

Example 5: Preparation of Nanocellulose-Dispersion Concentrate and Nanocellulose-Polypropylene Composite Lignin-coated nanofibrils are obtained from fractionation of lignocellulosic biomass (softwood chips) in the presence of an acid catalyst (sulfur dioxide), a solvent for lignin (ethanol), and water, to generate cellulose-rich solids, following by mechanical treatment of the cellulose-rich solids to generate the lignin-coated nanofibrils. The lignin-coated nanofibrils are present in an aqueous suspension (gel) with about 3 wt % solids.

A dispersion/drying agent is selected to be a copolymer of ethylene and acrylic acid, based on the lignin-coated nanofibrils and the selected matrix polymer (polypropylene). The specific dispersion/drying agent is Honeywell A-C® 580 wax (Honeywell Performance Materials and Technologies, Morris Plains, New Jersey, USA), which is an ethylene acrylic acid copolymer, in pellet form. Honeywell A-C® 580 wax contains 10 wt % acrylic acid and has an acid number of 75.

A starting nanocellulose-dispersion slurry is generated by combining under mechanical stirring 2,917 grams of the aqueous suspension of lignin-coated nanofibrils with 88 grams of the dispersion/drying agent described above. The starting nanocellulose-dispersion slurry initially contains about 3 wt % nanocellulose (lignin-coated nanofibrils) and about 94 wt % water. The starting slurry is dried with a semi-batch process under heat and shear, using a Brabender PL200 Plasti-Corder torque rheometer with Haake Rheomix 3000 mixer, mixing at mixing blades speed of 100 revolutions per minute (RPM) and a temperature of 120° C. The slurry is added to the rheometer continuously as the volume in the mixer bowl decreases as water is evaporated. The process continues until all the slurry has been fed and until all the moisture has evaporated from the material, for approximately 90 minutes, at which point the dry concentrate is removed from the mixer. The processing time and amount of water required to be removed during drying can be reduced significantly by pre-concentrating the slurry through centrifugation, for example. During mixing under heat, water is allowed to evaporate from the nanocellulose gel. As water is removed under shear mixing, the nanocellulose is prevented from agglomerating and bonding with itself and the wax phase acts as a spacer between the nanocellulose particles.

Once essentially all the water is removed from the starting nanocellulose-dispersion concentrate, the result is a nanocellulose-dispersion concentrate containing about 50 wt % nanocellulose (lignin-coated nanofibrils) and about 50 wt % dispersion/drying agent. While it is preferred to remove all water, it is possible for some residual moisture to remain in the nanocellulose-dispersion concentrate. It will also be appreciated that other nanocellulose concentrations may be employed for the nanocellulose-dispersion concentrate.

The nanocellulose-dispersion concentrate obtained above is then ground to a powder in a Bel-Art micro-mill. The resulting powder is then dispersed into polypropylene, as follows. Four parts by weight nanocellulose-dispersion concentrate and 96 parts by weight polypropylene random copolymer (ExxonMobil, Houston, Texas, USA) are combined and mixed in the Brabender torque rheometer. The rheometer is operated at a speed of 40 RPM and a temperature of 150° C., for 11 minutes. The resulting nanocellulose-polymer composite is shown in the optical micrograph (100× magnification) of FIG. 5, indicating evenly dispersed 2 wt % nanocellulose (lignin-coated nanofibrils) in polypropylene.

Example 6: Preparation of Nanocellulose-Dispersion Concentrate and Nanocellulose-Polylactide Composite Lignin-coated nanocrystals are obtained from fractionation of lignocellulosic biomass (hardwood chips) in the presence of an acid catalyst (sulfur dioxide), a solvent for lignin (ethanol), and water, to generate cellulose-rich solids, following by mechanical treatment of the cellulose-rich solids to generate the lignin-coated nanocrystals. The lignin-coated nanocrystals are present in an aqueous suspension (gel) with about 6 wt % solids.

A dispersion/drying agent is selected to be a copolymer of ethylene and acrylic acid, based on the lignin-coated nanocrystals and the selected matrix polymer (polylactide). The specific dispersion/drying agent is Honeywell A-C® 540A wax (Honeywell Performance Materials and Technologies, Morris Plains, New Jersey, USA), which is an ethylene acrylic acid copolymer, in powdered form. Honeywell A-C® 540A wax contains 5 wt % acrylic acid.

A starting nanocellulose-dispersion slurry is generated by combining under mechanical stirring 1,458 grams of the aqueous suspension of lignin-coated nanocrystals with 88 grams of the dispersion/drying agent described above. The starting nanocellulose-dispersion slurry initially contains about 6 wt % nanocellulose (lignin-coated nanocrystals) and about 89 wt % water. The starting slurry is dried with a semi-batch process under heat and shear, using a Brabender PL200 Plasti-Corder torque rheometer with Haake Rheomix 3000 mixer, mixing at mixing blades speed of 100 revolutions per minute (RPM) and a temperature of 120° C. The slurry is added to the rheometer continuously as the volume in the mixer bowl decreases as water is evaporated. The process continues until all the slurry has been fed and until all the moisture has evaporated from the material, for approximately 90 minutes, at which point the dry concentrate is removed from the mixer. The processing time and amount of water required to be removed during drying can be reduced significantly by pre-concentrating the slurry through centrifugation, for example. During mixing under heat, water is allowed to evaporate from the nanocellulose gel. As water is removed under shear mixing, the nanocellulose is prevented from agglomerating and bonding with itself and the wax phase acts as a spacer between the nanocellulose particles.

Once essentially all the water is removed from the starting nanocellulose-dispersion concentrate, the result is a nanocellulose-dispersion concentrate containing about 50 wt % nanocellulose (lignin-coated nanocrystals) and about 50 wt % dispersion/drying agent. While it is preferred to remove all water, it is possible for some residual moisture to remain in the nanocellulose-dispersion concentrate. It will also be appreciated that other nanocellulose concentrations may be employed for the nanocellulose-dispersion concentrate.

The nanocellulose-dispersion concentrate obtained above is then ground to a powder in a Bel-Art micro-mill. The resulting powder is then dispersed into polylactide, as follows. One part by weight nanocellulose-dispersion concentrate and 99 parts by weight polylactide (INGEO® PLA 4043D, NatureWorks LLC, Minnetonka, Minnesota, USA) are combined and mixed in the Brabender torque rheometer. The rheometer is operated at a speed of 40 RPM and a temperature of 140° C., for 11 minutes. The resulting nanocellulose-polymer composite is shown in the optical micrograph (100× magnification) of FIG. 6, indicating evenly dispersed 0.5 wt % nanocellulose (lignin-coated nanocrystals) in polylactide.

Example 7: Preparation of Nanocellulose-Dispersion Concentrate and Nanocellulose-Polylactide Composite Lignin-coated nanocrystals are obtained from fractionation of lignocellulosic biomass (hardwood chips) in the presence of an acid catalyst (sulfur dioxide), a solvent for lignin (ethanol), and water, to generate cellulose-rich solids, following by mechanical treatment of the cellulose-rich solids to generate the lignin-coated nanocrystals. The lignin-coated nanocrystals are present in an aqueous suspension (gel) with about 6 wt % solids.

A dispersion/drying agent is selected to be a copolymer of ethylene and acrylic acid, based on the lignin-coated nanofibrils and the selected matrix polymer (polylactide). The specific dispersion/drying agent is Honeywell A-C® 580 wax (Honeywell Performance Materials and Technologies, Morris Plains, New Jersey, USA), which is an ethylene acrylic acid copolymer, in pellet form. Honeywell A-C® 580 wax contains 10 wt % acrylic acid and has an acid number of 75.

A starting nanocellulose-dispersion slurry is generated by combining under mechanical stirring 1,458 grams of the aqueous suspension of lignin-coated nanocrystals with 88 grams of the dispersion/drying agent described above. The starting nanocellulose-dispersion slurry initially contains about 6 wt % nanocellulose (lignin-coated nanocrystals) and about 89 wt % water. The starting slurry is dried with a semi-batch process under heat and shear, using a Brabender PL200 Plasti-Corder torque rheometer with Haake Rheomix 3000 mixer, mixing at mixing blades speed of 100 revolutions per minute (RPM) and a temperature of 120° C. The slurry is added to the rheometer continuously as the volume in the mixer bowl decreases as water is evaporated. The process continues until all the slurry has been fed and until all the moisture has evaporated from the material, for approximately 90 minutes, at which point the dry concentrate is removed from the mixer. The processing time and amount of water required to be removed during drying can be reduced significantly by pre-concentrating the slurry through centrifugation, for example. During mixing under heat, water is allowed to evaporate from the nanocellulose gel. As water is removed under shear mixing, the nanocellulose is prevented from agglomerating and bonding with itself and the wax phase acts as a spacer between the nanocellulose particles.

Once essentially all the water is removed from the starting nanocellulose-dispersion concentrate, the result is a nanocellulose-dispersion concentrate containing about 50 wt % nanocellulose (lignin-coated nanocrystals) and about 50 wt % dispersion/drying agent. While it is preferred to remove all water, it is possible for some residual moisture to remain in the nanocellulose-dispersion concentrate. It will also be appreciated that other nanocellulose concentrations may be employed for the nanocellulose-dispersion concentrate.

The nanocellulose-dispersion concentrate obtained above is then ground to a powder in a Bel-Art micro-mill. The resulting powder is then dispersed into polylactide, as follows. One part by weight nanocellulose-dispersion concentrate and 99 parts by weight polylactide (INGEO® PLA 4043D, NatureWorks LLC, Minnetonka, Minnesota, USA) are combined and mixed in the Brabender torque rheometer. The rheometer is operated at a speed of 40 RPM and a temperature of 140° C., for 11 minutes. The resulting nanocellulose-polymer composite is shown in the optical micrograph (100× magnification) of FIG. 7, indicating evenly dispersed 0.5 wt % nanocellulose (lignin-coated nanocrystals) in polylactide.

Example 8: Preparation of Nanocellulose-Dispersion Concentrate for Non-Aqueous Chemical Systems Lignin-coated nanocellulose fibrils are obtained from fractionation of lignocellulosic biomass (softwood chips) in the presence of an acid catalyst (sulfur dioxide), a solvent for lignin (ethanol), and water, to generate cellulose-rich solids, following by mechanical treatment of the cellulose-rich solids to generate the lignin-coated nanocrystals. The lignin-coated nanocrystals are present in an aqueous suspension (gel) with about 3 wt % solids.

A dispersion/drying agent is selected to be an ammonia stearate emulsion, an ammonium salt of stearic acid. Stearic acid is a fatty acid with an 18-carbon chain with a chemical formula of $C_{17}H_{35}CO_2H$ and is chosen for bifunctional character, with a polar head group that can react with nanocellulose and lignin hydroxyl groups and a non-polar chain that confers solubility in organic solvents.

A starting nanocellulose-dispersion slurry is generated by mixing 3889 grams of the aqueous suspension of lignin-coated nanofibrils with 58 grams of ammonia stearate dispersion/drying agent, in aqueous emulsion form. The starting nanocellulose-dispersion slurry initially contains about 3 wt % nanocellulose (lignin-coated nanofibrils) and about 96 wt % water. The starting slurry is dried with a semi-batch process under heat and shear, using a Brabender PL200 Plasti-Corder torque rheometer with Haake Rheomix 3000 mixer, mixing at mixing blades speed of 100 revolutions per minute (RPM) and a temperature of 120° C., for 90 minutes. The slurry is added to the rheometer continuously as the volume in the mixer bowl decreases as water is evaporated. The process continues until all the slurry has been fed and until all the moisture has evaporated from the material, for approximately 90 minutes, at which point the dry concentrate is removed from the mixer. The processing time and amount of water required to be removed during drying can be reduced significantly by pre-concentrating the slurry through centrifugation, for example. During mixing under heat, water is allowed to evaporate from the nanocellulose gel. As water is removed under shear mixing, the nanocellulose is prevented from agglomerating and bonding with itself and the stearic acid (or stearate) acts as a spacer between the nanocellulose particles.

Once essentially all the water is removed from the starting nanocellulose-dispersion concentrate, the result is a nanocellulose-dispersion concentrate containing about 67 wt % nanocellulose (lignin-coated nanofibrils) and about 33 wt % dispersion/drying agent. While it is preferred to remove all water, it is possible for some residual moisture to remain in the nanocellulose-dispersion concentrate. It will also be appreciated that other nanocellulose concentrations may be employed for the nanocellulose-dispersion concentrate.

The nanocellulose-dispersion concentrate obtained above is then ground in a hammer mill and dispersed into diisononyl phthalate (DINP), a common plasticizer, as follows. Approximately two parts by weight nanocellulose-dispersion concentrate and 98 parts by weight DINP are combined at ambient conditions in a vortex mixer for 4 minutes. The resulting stable, thixotropic nanocellulose non-aqueous dispersion is shown in the optical micrograph (400× magnification) of FIG. 8, indicating evenly dispersed ~1.3 wt % nanocellulose (lignin-coated nanofibrils) in DINP.

What is claimed is:

1. A nanocellulose-containing composite product comprising:

(a) from about 0.05 wt % to about 50 wt % nanocellulose, wherein said nanocellulose has a crystallinity of at least 70%;

(b) from about 0.05 wt % to about 10 wt % compatibilizer, wherein said compatibilizer is selected from, wherein said alkenylsuccinic anhydrides have the formula:

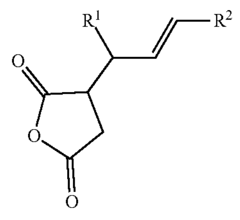

wherein $R^1$ is selected from $C_2$-$C_{24}$ linear or branched alkanes, $C_4$-$C_{24}$ linear or branched alkenes, $C_8$-$C_{24}$ linear or branched aromatics, or a combination thereof; and wherein $R^2$ is selected from $C_2$-$C_{24}$ linear or branched alkanes, $C_4$-$C_{24}$ linear or branched alkenes, $C_8$-$C_{24}$ linear or branched aromatics, or a combination thereof; and (c) from about 50 wt % to about 99.9 wt % matrix material.

2. The nanocellulose-containing composite product of claim 1, wherein said nanocellulose is present at a concentration of about 0.1 wt % to about 5 wt % in said nanocellulose-containing composite product.

3. The nanocellulose-containing composite product of claim 1, wherein said weight ratio of said nanocellulose to said compatibilizer is selected from about 0.1 to about 10.

4. The nanocellulose-containing composite product of claim 1, wherein said nanocellulose-polymer composite product consists essentially of said nanocellulose, said compatibilizer, and said matrix material.

5. The nanocellulose-containing composite product of claim 1, wherein said nanocellulose includes cellulose nanocrystals, cellulose nanofibrils, microfibrillated cellulose, or a combination thereof.

6. The nanocellulose-containing composite product of claim 1, wherein said nanocellulose includes lignin-containing nanocellulose.

7. The nanocellulose-containing composite product of claim 1, wherein said nanocellulose includes lignin-coated nanocellulose.

8. The nanocellulose-containing composite product of claim 1, wherein $R^1$ is selected from $C_5$-$C_{15}$ linear or branched alkanes; and wherein $R^2$ is selected from $C_5$-$C_{15}$ linear or branched alkanes.

9. The nanocellulose-containing composite product of claim 1, wherein said matrix material is selected from the group consisting of polymers, paper, paperboard, fiber and wood composites, emulsions, hydrogels, carbon, organic solids, inorganic solids, oils, organic liquids, inorganic liquids, cementitious materials, minerals, ceramics, metals, metal alloys, glass, and combinations thereof.

10. The nanocellulose-containing composite product of claim 9, wherein said polymers are selected from the group consisting of polyolefins, polyols, polyesters, polyamides, polylactide, polystyrene, polycarbonates, polyacrylates, polystyrenes, polybutadiene, styrene-butadiene rubbers, natural rubbers, polyurethanes, polyureas, poly(amide-enamine) s, polyanhydrides, polyhydroxyalkanoates, poly (alkene dicarboxylate) s, silicones, carbonaceous polymers, and combinations or co-polymers thereof.

11. The nanocellulose-containing composite product of claim 10, wherein said polymers are selected from the group consisting of polypropylene, polylactide, polybutadiene, styrene-butadiene rubbers, natural rubbers, and combinations or co-polymers thereof.

* * * * *